United States Patent [19]
Yokota et al.

[11] Patent Number: 6,125,206
[45] Date of Patent: *Sep. 26, 2000

[54] COLLABORATIVE LEARNING SYSTEM AND PATTERN RECOGNITION METHOD

[75] Inventors: Toshimi Yokota, Hitachioota; Hiroshi Shojima, Kashiwa; Soshiro Kuzunuki, Hitachinaka; Toshifumi Arai; Masaki Miura, both of Hitachi; Keiko Gunji, Mito; Yasushi Fukunaga, Hitachi, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/528,515

[22] Filed: Sep. 13, 1995

[30] Foreign Application Priority Data

Sep. 14, 1994 [JP] Japan ................................. 6-219817
Sep. 14, 1994 [JP] Japan ................................. 6-219818
Sep. 20, 1994 [JP] Japan ................................. 6-224741

[51] Int. Cl.$^7$ .................................................. G06K 9/62
[52] U.S. Cl. ................................................................ 382/189
[58] Field of Search .................... 395/23, 102; 382/181, 382/185, 187, 189; 364/419.03, 419.11; 704/10; 707/530, 532, 541

[56] References Cited

U.S. PATENT DOCUMENTS 4,180,798  12/1979  Komori et al. .................. 340/146.3 H
5,468,077  11/1995  Motokado et al. ...................... 395/102
5,535,120   7/1996  Chong et al. ....................... 364/419.03
5,555,439   9/1996  Higashino et al. ...................... 395/23
5,982,928  11/1999  Shimada et al. ......................... 382/187

FOREIGN PATENT DOCUMENTS 55-135973  10/1980  Japan ................................ G06K 9/62
56-99583    8/1981  Japan ................................ G06K 9/62
62-15911    4/1987  Japan ................................ G06K 9/62
2-56689     2/1990  Japan ................................ G06K 9/62

*Primary Examiner*—Andrew W. Johns
*Attorney, Agent, or Firm*—Kenyon & Kenyon

[57] ABSTRACT

The present invention relates to a multi-user pattern data processing system configured for various kinds of patterns, such as characters, to learn efficiently and effectively. The present invention comprises an input arrangement 1 having patterns entered therein from a plurality of users, a dictionary 2 having patterns and attributes of the patterns belonging thereto defined therein, a recognizing arrangement 4 that receives the entered pattern and a group attribute and retrieves from among the patterns entered in the dictionary and having a corresponding group attribute to feed out the category, and a dictionary editing arrangement 5 for extracting a pattern used in common by a group before editing the pattern, such as entering it in the common dictionary, with the group having the user made to belong thereto. The invention allows the dictionary used to the pattern recognition to learn very efficiently and effectively.

7 Claims, 34 Drawing Sheets

FIG. 9
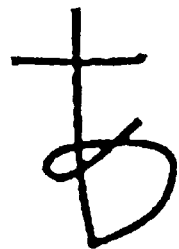
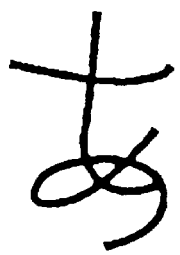
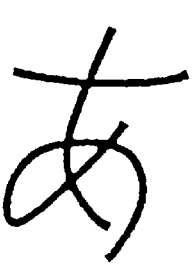
p1
ADAPTABILITIES
= 1, 1 AND 1
p2
ADAPTABILITIES
= 0.5, 0.5 AND 0.5
p3
ADAPTABILITIES
= 1, 1 AND 1
p4
ADAPTABILITIES
= 1, 1 AND 1
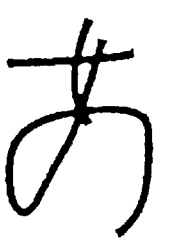
p5
ADAPTABILITIES
= 0.5, 0.5 AND 0.5
p6
ADAPTABILITIES
= 0.5, 0.5 AND 0.5
p7
ADAPTABILITIES
= 0.25, 0.25 AND 0.25
FIG. 10
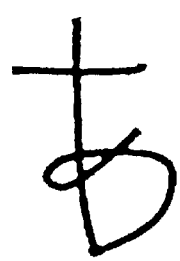
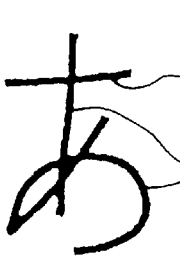
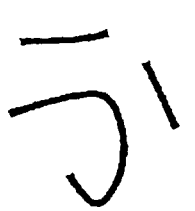
pc1
ADAPTABILITIES
= 1, 1 AND 1
COPY p1
pc2
ADAPTABILITIES
= 0.25, 0.5 AND 0.5
CROSS-OVER (p6 AND p7)
FROM p7
FROM p6
pc3
ADAPTABILITIES
= 0.5, 0.5 AND 0.5
MUTATION FIG. 24
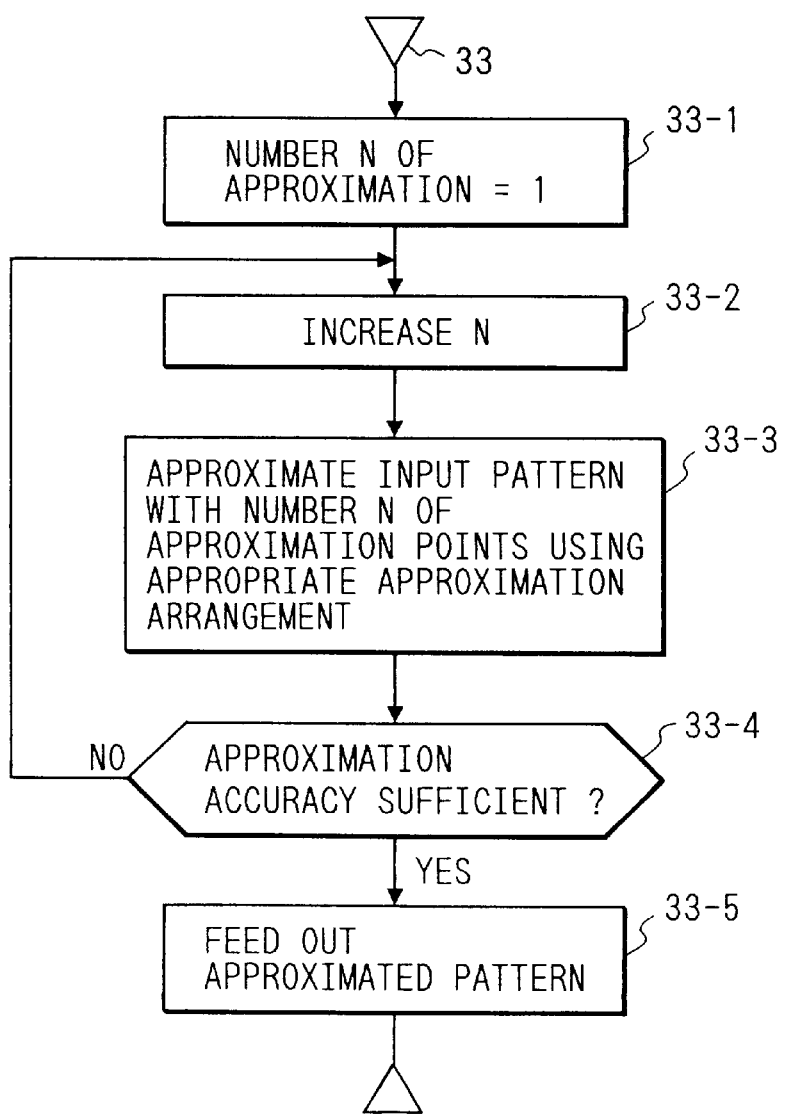
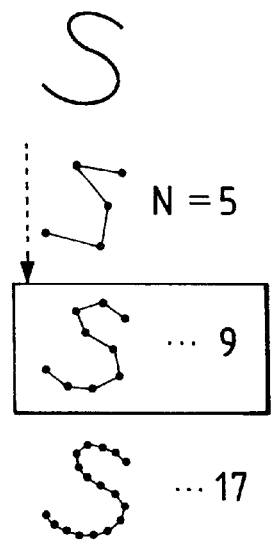

WHERE
$\dot{v}(i) = v(i+1) - v(i)$

INPUT PATTERN "*mu"

DICTIONARY PATTERN "*mu"

DICTIONARY PATTERN "*hi"

| j | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| vec ; | LL | LL | LL | LL | ST | RL | RL | RL | RL | LL | LL | LL | LL | LL | LL | ST |
| joint; | ST | LA | LA | LA | ST | ST | RA | RA | RA | RA | LA | LA | LA | LA | LA | LA |
| jcode; | 0 | 38 | 91 | 106 | 28 | -13 | -53 | -131 | -112 | -34 | 45 | 50 | 40 | 33 | 127 | 106 |

| | ↻ | △ | ↻ | ↔ | ↺ | △ | ↻ |
|---|---|---|---|---|---|---|---|
| ↻ | 0 | 10 | 20 | 20 | 10 | 20 | 20 |
| △ | | 0 | 10 | 20 | 20 | 20 | 20 |
| ↻ | | | 0 | 10 | 20 | 20 | 20 |
| ↔ | | | | 0 | 10 | 20 | 20 |
| ↺ | | | | | 0 | 10 | 20 |
| △ | | | | | | 0 | 20 |
| ↻ | | | | | | | 0 |

COLLABORATIVE LEARNING SYSTEM AND PATTERN RECOGNITION METHOD

BACKGROUND OF THE INVENTION

The present invention relates to a pattern data processing system configured for various kinds of patterns, such as characters and voices, on the assumption of multi-user. More particularly, it concerns a pattern data processing system having a learning function.

Also, the present invention relates to a pattern recognizing method of and system for executing a recognizing process of entered character and figure patterns.

There was proposed a prior art of pattern recognizing system in, for example, the Japanese Patent Laid-Open No. 55-135973. The prior art is of learning method on the assumption of a particular, or a single, user. It executes learning of patterns given by the users in, for example, the way that necessary data are entered in a data base to process.

For the reason, the prior art has to be made to learn the patterns used in common by a plurality of users (members) of a group individually even if the common patterns are agreed by them. That is, if a mark or the like is to be used in common by the members of the group, to make it possible to enter it by hand-writing, the individual users who are the members of the group have to make it to be pattern-learnt.

As an example, the group uses a kana-kanji conversion of a word processor that is a tacit common agreement in the group. If a term "*bishamon" should be converted to "*BISHAMON," for example, the term has to be entered individually. That is, to increase operationability of the own pattern data processing system, the user has to make by himself or herself, or ask another user to make the system learn the pattern. In other words, the operationability of the own pattern data processing system cannot be increased forever unless the user has to make, by himself or herself, or ask another user to make the system learn the pattern.

Therefore, to increase the operationability of the own pattern data processing system without making pattern learning by the user by himself or herself or asking another user to do it, it is a problem to allow another person of the group to use results of the pattern learning of the system.

It is preferable that the members of the group should learn tacit, or expressed, common agreements to omit their individual operations and increase the operationability. That is, a pattern data processing system for multi-user should be preferably made for generally wide use by not only a single user, but also a plurality of users.

For the purpose, there are problems: one is to extract patterns that would be used in common by a plurality of users of a group, and the other is to make the common patterns to be learnt as the ones belonging to the group.

Prior filing systems, such as the UNIX, are made to allow all the members of the group to read and write the files in the way that the files are prepared to have a group attribute. However, the prior filing system art alone has the disadvantage that a system manager of the group must make a plan in what a way and how data should be rewritten, or learnt by a dictionary, to increase the operationability.

There was proposed another prior art of pattern recognizing system in the Japanese Patent Laid-Open No. 56-99583. This prior art is a method of obtaining a recognition result with use of a plurality of recognizing arrangements for respective characters to recognize them accurately depending on pattern. The method obtains candidates based upon appearance rates. However, the method has the disadvantage that if the appearance rate is low, recognition cannot be made even at a high accuracy a pattern is entered.

There was proposed still another prior art of pattern recognizing system in the Japanese Patent Publication No. 62-15911. This prior art is a method that a dictionary has description of what parts form what shape is. There was proposed still another prior art of pattern recognizing system in the Japanese Patent Laid Open No. 2-56689. This prior art discloses a method in which a dictionary includes a description of what stroke are continuations of what shapes. These prior arts are based on that a recognition result can be made close to that of man or woman in the way that pattern recognition is made with use of parts of a pattern being formed of a joint or loop. However, the pattern recognizing system disclosed in the Japanese Patent Publication No. 62-15911 has the disadvantage that if a continuously handwritten character to be recognized has many curves as in hiragana, elongated or contracted parts of the character make it difficult to designate in advance what parts of the character are, resulting in wrong recognition. The pattern recognizing system disclosed in the Japanese Patent Laid-Open No. 2-56689 has the disadvantage that a possible turbulence or distortion of the shape makes it difficult to judge what the shape is, resulting in wrong recognition.

SUMMARY OF THE INVENTION

The pattern data processing system of the present invention on the assumption of multi-user has the following three features.

The first feature of the present invention is a pattern data processing system, comprising: an input arrangement for receiving given patterns at least, a dictionary having data classified plurally for a plurality of users, a common dictionary, and a dictionary editing arrangement; wherein the dictionary has a group attribute of the users therein, if the pattern given through any of the input arrangements meets predetermined conditions the dictionary editing arrangement edits the data in the dictionary and enters the pattern and code corresponding to the pattern in the group dictionary, and the users having the same group attribute is accessible to the group dictionary.

In detail, the above-described first feature comprises an input arrangement having patterns entered therein, a dictionary having patterns, categories having the patterns belong thereto, and groups defined therein, an attribute designating arrangement for designating group attributes, such as user 1, user 2, group 1, group 2, and all members, a recognizing arrangement for receiving the entered pattern and group attribute before retrieving from among the patterns entered in the dictionary a pattern most similar to the entered one and having a corresponding group attribute to feed out the category, and a dictionary editing arrangement for extracting a pattern used in common by a group before editing the pattern, such as entering it in the common dictionary, with the group having the user made to belong thereto.

Operation of the first feature is described below. First, the entered pattern, such as a character, voice, or code string, entered through the input arrangement is fed to the recognizing arrangement together with the group attribute designated by the attribute designating arrangement. In turn, when receiving the entered pattern and the group attribute, the recognizing arrangement retrieves from among the patterns in the dictionary the pattern most similar to the entered one and having a corresponding group attribute before feeding out the category of the pattern belonging thereto. The category is a concept higher than the pattern and has at least one or more patterns belong thereto. If the entered pattern is a code string, the recognizing arrangement retrieving an entered pattern from among the patterns in the dictionary before feeding out a code indicating a process associated with the pattern. The dictionary editing arrangement checks contents of the dictionary before extracting a pattern that would be used in common by the group and enters the pattern with the group attribute of the pattern being the group. Therefore, even if the user belonging to the group does not enter the pattern by himself or herself, the first feature allows pattern recognition and pattern process with use of the pattern.

The second feature of the present invention is a pattern data processing system, comprising: a plurality of input arrangement for at least receiving given patterns, dictionaries for storing the entered patterns and one or a plurality of codes corresponding to the entered patterns with priorities, the dictionaries being provided for the respective input arrangements, and a dictionary look-up arrangement for retrieving a code corresponding to the pattern given through any of the input arrangement from among the dictionary corresponding to the input arrangement and the other dictionaries before feeding out one or a plurality of codes obtained as results of the retrieval and their priorities.

In detail, the above-described second feature comprises a plurality of input arrangement for entering patterns, dictionaries for storing the entered patterns and one or a plurality of codes corresponding to the entered patterns with priorities, the dictionaries being provided for the respective input arrangements, and a dictionary look-up arrangement for receiving the pattern entered through any of the input arrangements before retrieving a pattern coinciding with or mostly similar to the entered pattern from among the dictionary corresponding to the input arrangement and the other dictionaries before feeding out the code and its priority, wherein the dictionary look-up arrangement has dictionary priorities that are priorities preset for the dictionaries.

Operation of the second feature is described below. First, the pattern, such as a character, voice, or code string, entered through the input arrangement is fed to the dictionary look-up arrangement. In turn, when receiving the entered pattern, the dictionary look-up arrangement retrieves a pattern coinciding with or mostly similar to the entered pattern from among the dictionary corresponding to the input arrangement having entered the pattern and patterns existing in the other dictionaries before reassigning the code with a priority on the basis of the dictionary priorities that are priorities preset for the dictionaries to feed out. Therefore, even if the user does not enter the pattern by himself or herself, the second feature allows pattern recognition and pattern process with use of the pattern.

With assigning the priority on the basis of the dictionary priorities, the user can make a definition of his or her dictionary prior to that of the other dictionaries even if the own dictionary and the other user dictionaries have different codes for the same pattern.

The third feature of the present invention is a pattern data processing system, comprising: a plurality of input arrangement for at least receiving given patterns, dictionaries for storing the entered patterns and one or a plurality of codes corresponding to the entered patterns with priorities, the dictionaries being provided for the respective input arrangements, and a dictionary editing arrangement wherein if any of the dictionaries are updated, a relationship between the updated entered pattern and a code corresponding to the updated entered pattern is entered for the other dictionaries.

Operation of the third feature is described below. First, if the dictionary editing arrangement detects that data (an entered pattern and a code corresponding to the entered pattern with a priority) are updated after checking contents of the dictionaries, the arrangement enters the updated data into the other dictionaries having had not define the updated entered pattern. Therefore, if any of the users updates contents of the dictionary, the other users can use the updated data without entering the contents by themselves.

In turn, if an appropriate recognizing method is different depending on pattern, the pattern recognizing arrangement of the present invention that can increase accuracy of the recognition has the following feature.

The pattern recognizing system comprises a plurality of recognizing arrangements, a normalizing arrangement for normalizing distance values obtained by the recognizing arrangements, and a correct candidate deciding arrangement for deciding correct candidates on the basis of the normalized distance values. Even for the distance value obtained with use of the optimum recognizing arrangement for each pattern, or even for the distance value obtained in a different recognizing method, the distance value can be normalized so that recognition can be made accurately by reference to the distance value.

In turn, if parts of an entered patterns are elongated or contracted, the pattern recognizing arrangement of the present invention that can recognize accurately has the following feature.

The pattern recognizing system of the present invention comprises an input arrangement for entering a pattern, a normalizing arrangement for normalizing the pattern, an approximating arrangement for approximating the normalized pattern with broken lines, a dictionary for storing the dictionary patterns approximated with the broken lines, a distance calculating arrangement for comparing the entered pattern approximated with the broken lines with the dictionary pattern, and a distance sorting arrangement for sorting the dictionary patterns in terms of distance values from the entered patterns. The distance calculating arrangement is featured in having a range correspondence arrangement for making each element of the approximated entered pattern to correspond the respective elements of the approximated dictionary pattern, and a particular shape difference calculating arrangement for calculating a particular shape difference for evaluation of whether or not a particular shape formed of some elements of approximation results exists at a corresponding position of the dictionary pattern and entered pattern. The feature allows the pattern entered by the input arrangement to be normalized by the normalizing arrangement. The normalized pattern is approximated with broken lines by the approximating arrangement. The entered pattern approximated with the broken lines by the distance calculating arrangement and the dictionary pattern are compared with each other, The distance sorting arrangement sorts the dictionary pattern in terms of the distance value from the entered pattern as a recognition result.

The range correspondence arrangement that is a part of the distance calculating arrangement makes a range correspondence for each broken line of the entered pattern and the dictionary pattern, The particular shape difference calculating arrangement evaluates whether or not the particular shape of the dictionary pattern exists at a position corresponding to the entered pattern before compares the input pattern with the dictionary pattern. That is, the range corresponding arrangement can absorb such a deformation as partial elongation or contraction. Also, the particular shape difference calculating arrangement can absorb such deformations as shape turbulence and distortion. Hence, the features can make correct pattern recognition.

BRIEF DESCRIPTION OF THE DRAWINGS

In the accompanying drawings:

FIG. 9 is handwritten figures illustrating still another embodiment of the present invention with use of a dictionary;

FIG. 10 is handwritten figures illustrating still another embodiment of the present invention with use of a dictionary;

FIG. 24 is a flow diagram illustrating operation steps of the approximation control arrangement;

FIG. 34 is a list illustrating an example of results of the process of the particular shape difference;

DETAILED DESCRIPTION OF THE PREFERRED EMBODIMENTS

Figure 1:
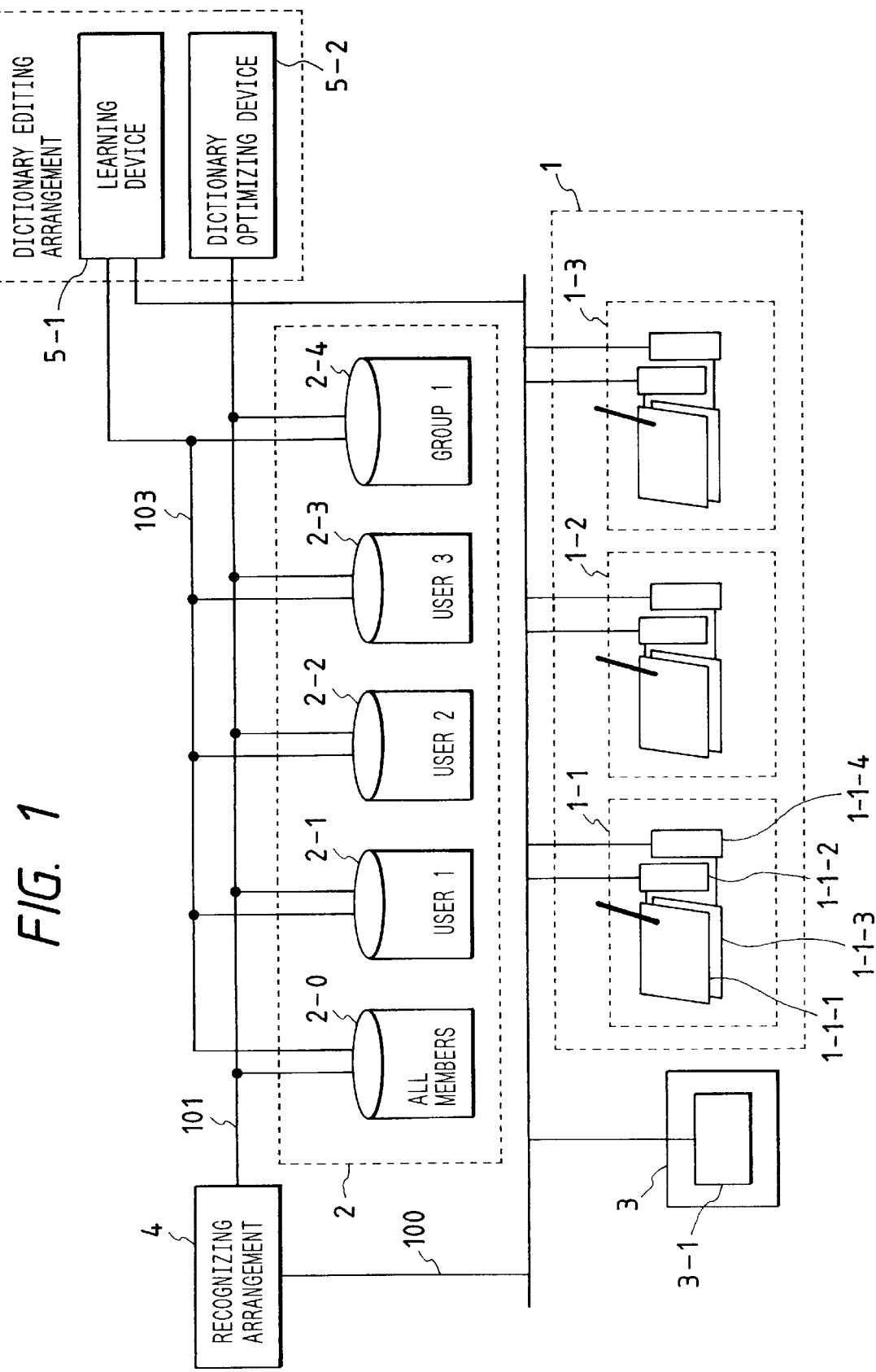
FIG. 1 is a block diagram illustrating configuration of a pattern data processing system of a first embodiment of the present invention, with use of a dictionary.

The following describes in detail embodiments of the pattern data processing apparatus for a multiple of users according to the present invention by reference to FIGS. 1 to 18 of the accompanying drawings.

A first embodiment of the present invention is an example of handwritten character input system with use of a character pattern recognition process by way of on-line.

Of course, it need hardly be said that the present invention can be applied to recognition of voices, figures, and similar patterns and code-string patterns and the characters as well.

First, configuration of the first embodiment is described below by reference to FIG. 1.

The system in the first embodiment comprises input arrangements 1, dictionaries 2, a main memory 3, a recognizing arrangement 4, and a dictionary editing arrangement 5.

The input arrangements 1 include has a plurality of input devices 1-1, 1-2, and 1-3. The main memory 3 has a main memory 3-1.

The dictionaries 2 include a plurality of dictionaries 2-0, 2-1, 2-2, 2-2, 2-3, and 2-4 with categories and attributes taken into account.

The dictionary editing arrangement 5 has a learning device 5-1 and a dictionary editing arrangement 5-2.

The following describes components devices of the system.

The input arrangement 1 comprises three inputs devices each of which has a pen, a liquid crystal display (LCD) 1-1-1, a input arrangement 1-1-2, a input arrangement 1-1-3, and a input arrangement 1-1-4 at least.

A user should draw a stroke on the tablet with use of the pen to enter commands for entering a character pattern, designating a user's name, entering a character pattern to learn for recognition, and learning.

The stroke written on the tablet with the pen the user is displayed on a screen of the input arrangement 1-1-1. The input arrangement 1-1-2 makes the display process. The input arrangement 1-1-2 is made up of a CPU, a ROM, a RAM, a variety of CMOSes, and a program stored in the ROM. The input arrangement 1 also can display necessary output data.

The display for the present invention is not limited of the liquid crystals, but of other similar devices, such as EL devices.

The user can use the input arrangement in a manner similar to using paper to write.

As described above, the system of the first embodiment is formed of the plurality of input devices 1-1, 1-2, and 1-3 on the assumption of multi-user that there are a plurality of users.

The input arrangement 1 feeds out to a signal line 100 entered data, such as the character pattern, and ID data added to the tablet having the entered data. The additional ID data are preset to identify the input arrangement. For example, different alphanumeric characters are preset individually. An output circuit for feeding the ID data to the signal line 100 should be formed of electronic devices, such as CMOSes.

The dictionaries 2 have patterns, categories to which the patterns belong, types of characters, and attributes, such as posts, stored therein. Data of the dictionaries 2 are classified by attribute to increase efficiency of the recognition process, which will be described later in detail.

The categories are of higher order than the patterns. A single category has at least one pattern belonged thereto.

The attributes include group names to which the users are attached.

In the first embodiment, as shown in FIG. 1, the data of the dictionary are classified by attribute of group (data belonging to user) into "all members" 2-0, "user 1" 2-1, "user 2" 2-2, "user 3" 2-3, and "user 4" 2-4. (The users in the first embodiment are members of the group that use the system.) Of course, the data of the dictionary may be classified by attribute of kind of character or similar attributes.

The main memory 3-1 is provided in the main memory 3 to function to designate the attribute upon pattern recognition.

The main memory 3 is formed of, for example, semiconductor devices such as RAM or an optical or magnetic disk.

The main memory 3-1 also functions to store the user name and the ID data of the tablet used currently by the user if receiving them through the signal line 100. The main memory 3-1 further functions to store the type of character designated by an application if the application is started. The main memory 3-1 then feeds out to the signal line 100 the group and type of character corresponding to the some signal and ID data entered received through the signal line 100 by each of the input arrangement 1.

The recognizing arrangement 4 receives the pattern to be recognized and attributes, such as the group and type of character through the signal line 100. The recognizing arrangement 4 then looks contents of the dictionaries 2 through the signal line 100 before retrieving shape of the pattern to be recognized and most similar one from among the patterns having the attributes of group and types of character. The recognizing arrangement 4 then feeds out the category attributes through the signal line 100.

As an example, the recognizing arrangement 4 is formed of electronic devices, such as a CPU, a ROM, and a RAM, and a program stored in the ROM.

Judgment whether the pattern is similar or not is evaluated with use of a predetermined matching function. The Japanese Patent Application Laid-Open No. 63-254589 and 2-53193 disclosed (1) representation of the shape of pattern and (2) the matching function.

In the above-mentioned arts, for example, the "shape of pattern" should be represented in terms of points of coordinates approximated by number N of points of strokes in a kanji. The "matching function" should be represented by a linear equation with parameters of points of coordinates in the entered pattern and patterns of the dictionary.

As described above, the dictionary editing arrangement 5 comprises the dictionary editing arrangement 5-1 and the dictionary editing arrangement 5-2. The dictionary editing arrangement 5, for example, is formed of electronic devices, such as a CPU, ROM, and RAM, and a program stored in the ROM.

The dictionary editing arrangement 5-1 receives through the signal line 100 (1) the pattern to be learned to recognize, (2) the command for learning, (3) the attributes of pattern, such as type of character and category, and (4) the group attribute fed out of the main memory 3 that have been fed out by the input arrangement 1. The dictionary editing arrangement 5-1 then enters the pattern data into the dictionary. That is, the dictionary editing arrangement 5-1 is means for making learning, or enters the pattern data into the dictionary pattern of the corresponding user.

It is preferable in view of operationability that the dictionary editing arrangement 5-1 does not only enter the pattern data by operation of the user, but also if recognition of the character pattern given by the user is wrong, automatically fetches the pattern data before entering it in the dictionary.

The wrong recognition is defined as, for example, the first candidate is wrong-recognized after an entered pattern is recognized if the user selects an N'th candidate from among candidate characters. It is preferable, as described above, to enter the input pattern in the dictionary as the N'th character code in advance.

The dictionary editing arrangement 5-2 is a heart of the present invention.

The dictionary editing arrangement 5-2 detects a superior part of a user dictionary before making process so that the part can be made available by all the users of the group. The process will be described later in detail.

The term "superior part" is defined as the entered data if a pattern, such as a symbol mark of the group, used in common by the members of the group is entered in the user dictionary of a member.

As described above, the first embodiment has been described with the example of character recognizing system. The first embodiment also can be can be applied to general matching systems for voice pattern recognition and kana-kanji conversion with the dictionary editing arrangement 5-2 provided therein to learn a variety of patterns for multi-user.

Figure 2:
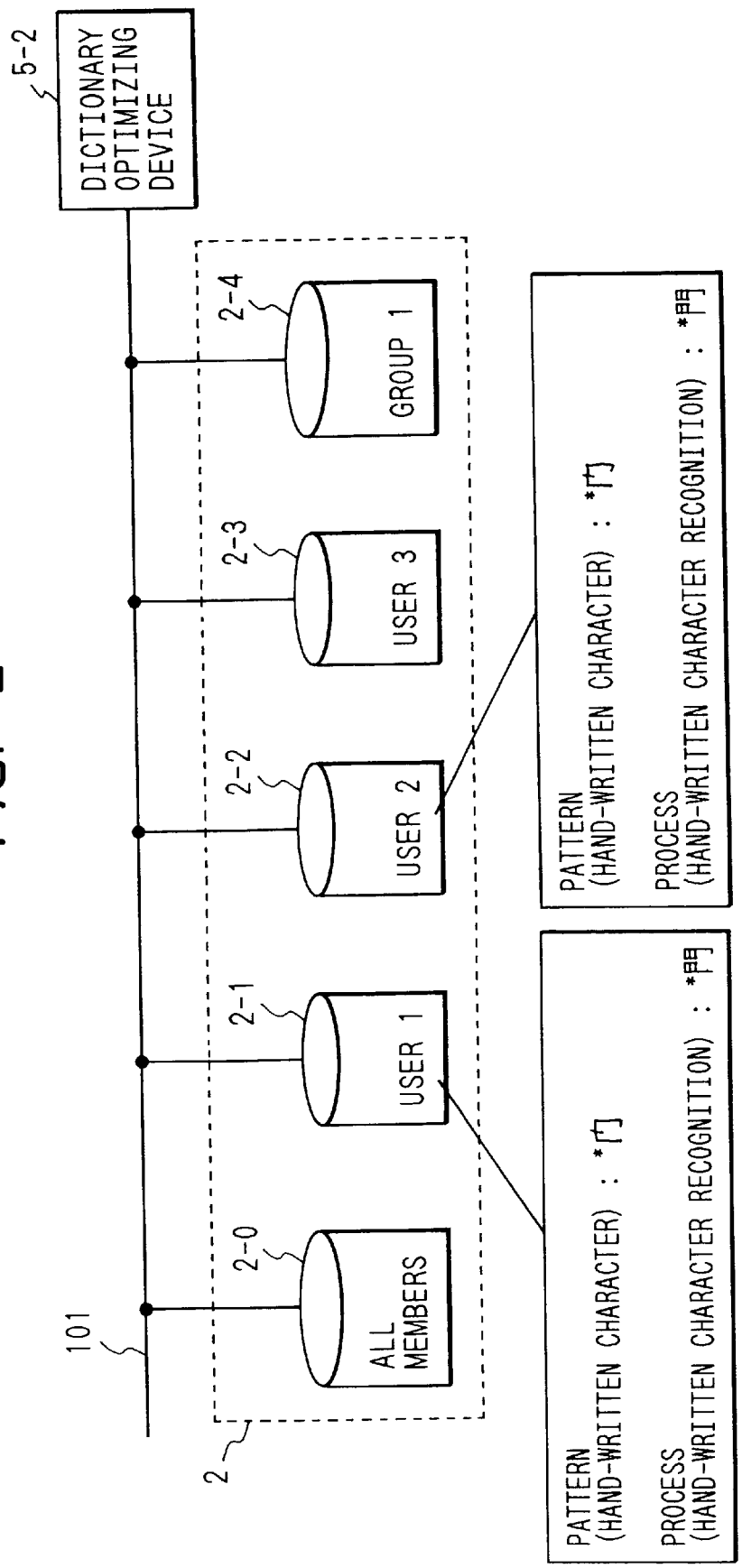
FIG. 2 is a block diagram illustrating a learning with use of a dictionary.

FIG. 2 depicts a block diagram illustrating a process of the dictionary editing arrangement 5-1 in which the users 1 and 2 entered individual handwritten kanjies of "*MON" (gate).

The dictionaries 2-1 and 2-2 have patterns of the kanji "*MON" handwritten by the individual users entered therein. That is, the dictionaries of the two user that are the majority of the three members of group 1 have a common pattern entered therein.

In general, empirical facts teach us that the pattern used conveniently by the majority are often convenient for the other persons.

Figure 3:
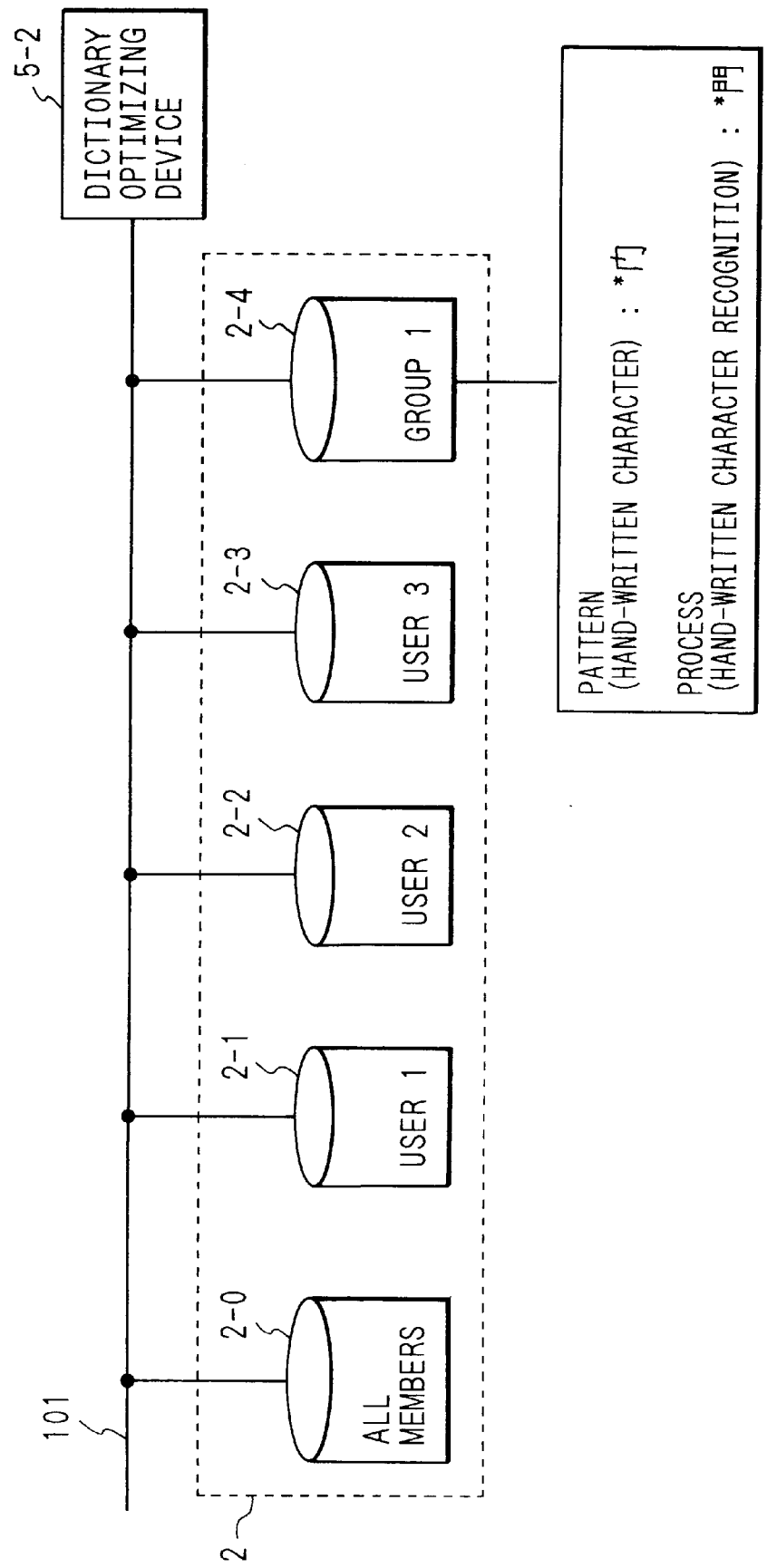
FIG. 3 is a block diagram illustrating a learning with use of a dictionary.

FIG. 3 depicts a block diagram illustrating a state of process that the dictionary editing arrangement 5-2 executes its process and as a result, detects the pattern data as superior parts in the user dictionaries 2-1 and 2-2 before entering in the dictionary 2-4 of group 1, and deletes the kanji patterns of "*MON" from the two user dictionaries 2-1 and 2-2.

Of course, the common pattern may not be deleted, but left saved in the two user dictionaries 2-1 and 2-2.

In turn, the following further describes the configuration of the dictionary editing arrangement 5-2 in detail with embodiments.

First, the first embodiment is described below by reference to FIGS. 4 and 5.

Figure 4:
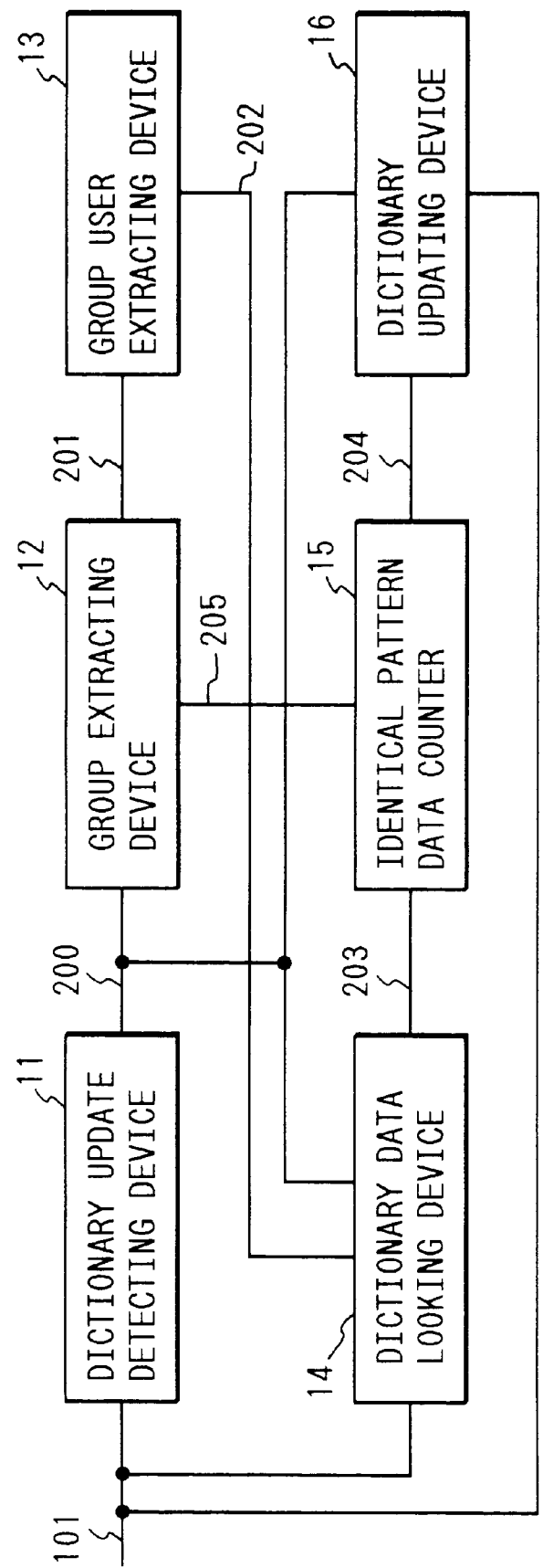
FIG. 4 is a block diagram illustrating an example of learning arrangement 5-1.

FIG. 4 depicts a block diagram illustrating a hardware configuration. FIG. 5 depicts a flow diagram illustrating procedures.

The dictionary editing arrangement 5-2 in the first embodiment comprises a dictionary update detecting device 11, a group extracting device 12, a group user extracting device 13, a dictionary data looking device 14, an identical pattern data counter 15, a dictionary updating device 16, and signal lines for interconnecting them. These devices are formed of, for example, electronic devices, such as a CPU, a ROM, a RAM, CMOSes, and a program stored in the ROM.

If pattern data in the dictionaries 2 are updated, the dictionary update detecting device 11 detects the updated pattern data before feeding the data to the signal line 200.

As an example, with the dictionary editing arrangement 5-2 connected with the dictionary editing arrangement 5-1 through the signal line, if the dictionary editing arrangement 5-1 updates the data in the dictionaries 2, the dictionary editing arrangement 5-2 can receive the updated data.

As another example, the dictionary editing arrangement 5-2 can check the time of updating the dictionary file every unit time, if the update was made after the preceding one, judge that the dictionary was newly updated, and compare the new data with the old one to obtain different data. The different data should be stored in the main memory 3. The dictionary editing arrangement 5-2 should store the update dictionary as the old one to detect that the update should be made in next time.

The group extracting device 12 checks a group attribute, or a user, of the updated pattern data if receiving the pattern data through the signal line 200. The group extracting device 12 then extracts all the groups to which the user belong before feeding the data concerning the groups to the signal line 201. The reason is that the user belong possibly to a plurality of groups. If the user is allowed to belong to the plurality of groups, there also should be provided a plurality of group dictionaries.

For the purpose, the main memory 3, for example, has to have corresponding relationships of the users and the groups stored in advance. Of course, the group extracting device 12 may be made to have a storing device for storing such a corresponding relationships. Alternatively, if the present system is built in a workstation system, a feature of the workstation system may be used for that purpose. That is, since some OS (operating system) installed in the workstation has the feature for defining the relationships of the users and the groups, the feature can be used for the purpose.

The group user extracting device 13 extracts all the users belonging to a group if receiving the group data through the signal line 201. The group user extracting device 13 then feeds the user data to the signal line 202. For the purpose, the group user extracting device 13 has to have corresponding relationships of the users and the groups stored in advance, and a storing device is required. The storing device can be provided in the main memory 3, the group user extracting device 13 itself, or a memory of the workstation system if the present system is implemented in the workstation system.

The dictionary data looking device 14 looks the dictionary belonging to a user if receiving the pattern data through the signal line 200 and the user data through the signal line 202. The dictionary data looking device 14 also feeds signal to the signal line 203 if the pattern data and the category received through the signal line 200 are identical with that of the dictionary and if shape of the pattern are similar to that of the dictionary. Judgment of the similarity of the patterns is made in a way that the dictionary data looking device 14 evaluated the pattern with the matching function for use in the recognizing arrangement 4 before comparing the evaluated value a predetermined threshold value.

If the evaluated value becomes the threshold value, for example, the dictionary data looking device 14 judges that shape of the pattern is similar to that of the dictionary.

The identical pattern data counter 15 receives the pattern data of the similarity of the pattern shape through the signal line 203 before counting number of similar patterns.

If the countered number meets a predetermined condition, the identical pattern data counter 15 feeds the received data to the signal line 204.

The identical pattern data counter 15 should be constructed to feed the received data to the signal line 204 on that the counted number exceeds a certain natural number N, for example, 2 or more. In this case, the constant number N may be a function of number of members of a group, for example, N=(number of members)×A+B where A and B are real numbers.

The dictionary updating device 16 receives the pattern data belonging to the same group and data concerning designation of the group through the signal line 204 before entering typical pattern data into the user dictionary belonging to the group.

The pattern shape of the typical pattern data is obtained in a way that all the pattern features of the pattern data received through the signal line 203 are averaged.

If such an averaging process cannot be made in, for example, a structural analysis of character patterns, as the pattern features are not represented by numbers, any one or more of typical pattern features should be used.

The dictionary updating device 16 deletes the pattern data received through the signal line 204. The pattern data received through the signal line 204, of course, may be left without deleting them as they were.

Figure 5:
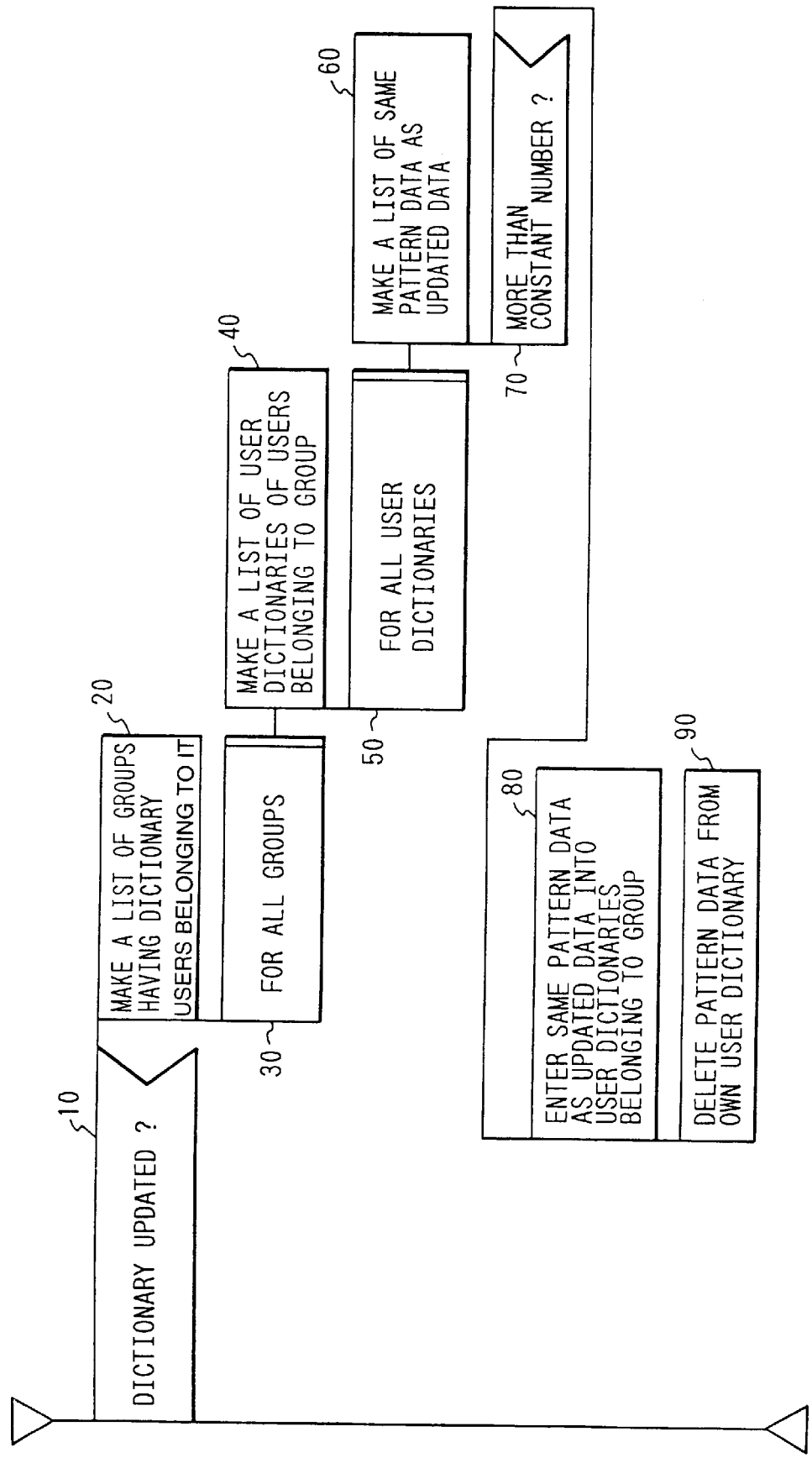
FIG. 5 is a flow diagram illustrating procedures of the present invention.

FIG. 5 depicts a flow diagram illustrating procedures of the dictionary editing arrangement 5-2 configured as described above.

First, step 10 starts the dictionary update detecting device 11 to judge whether the dictionary is updated or not. If it is updated, the step is branched to step 20. Step 20 proceeds as follows.

Step 20 starts the group extracting device 12 makes up a list of groups to which the dictionary belongs. Step 30 proceeds for the groups as follows.

That is, step 40 starts the group user extracting device 13 to make us a list of user dictionaries of users who belong to the group.

Step 50 proceeds for the user dictionaries as follows. That is, step 60 starts the dictionary data looking device 14 to make up a list of the same pattern data as the updated ones. Further, step 70 starts the identical pattern data counter 15 to count the same pattern data as the updated ones. In turn, if the counted value meets a predetermined condition, for example, if it exceeds a judgment condition that is a predetermined threshold value, step 80 starts the dictionary updating device 16 before entering the same pattern data as the updated ones in the user dictionaries of the group. Step 90 deletes from the user dictionaries the same pattern data as the updated ones.

The dictionary editing arrangement 5-2 repeats above-described procedures frequently. Instead, it is preferable that a metagroup, which is a group higher than the group, can be made definable so that similar procedures can update the dictionaries.

As described above, the first embodiment can accomplish a recognizing apparatus for a variety of patterns for multi-user so that if a plurality of users enter identical or similar patterns, the other users can use the patterns.

In turn, the following describes a second embodiment according to the present invention.

Figure 6:
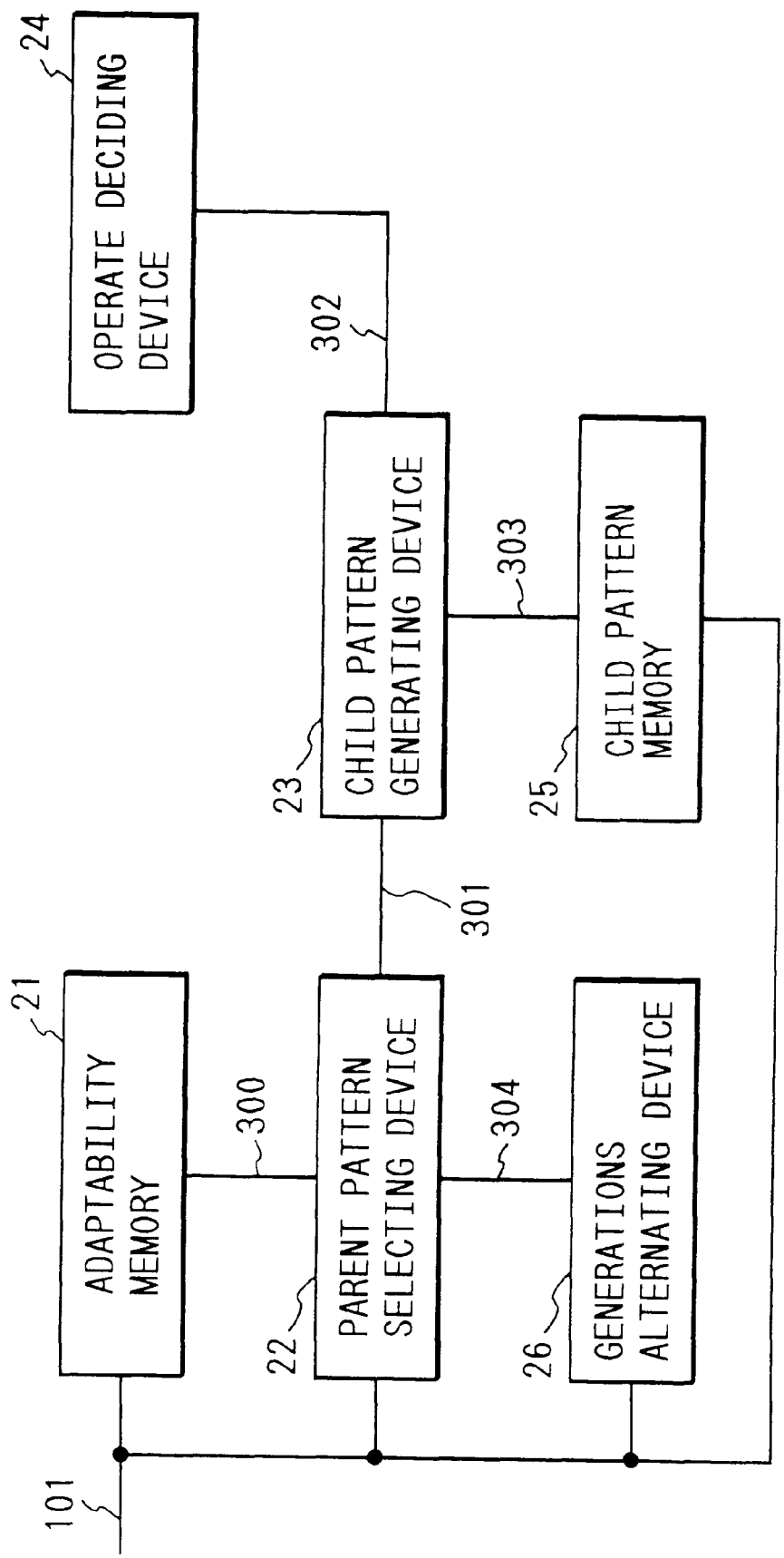
FIG. 6 is a block diagram illustrating detailed configuration of the learning arrangement 5-1 in another embodiment of the present invention.
Figure 7:
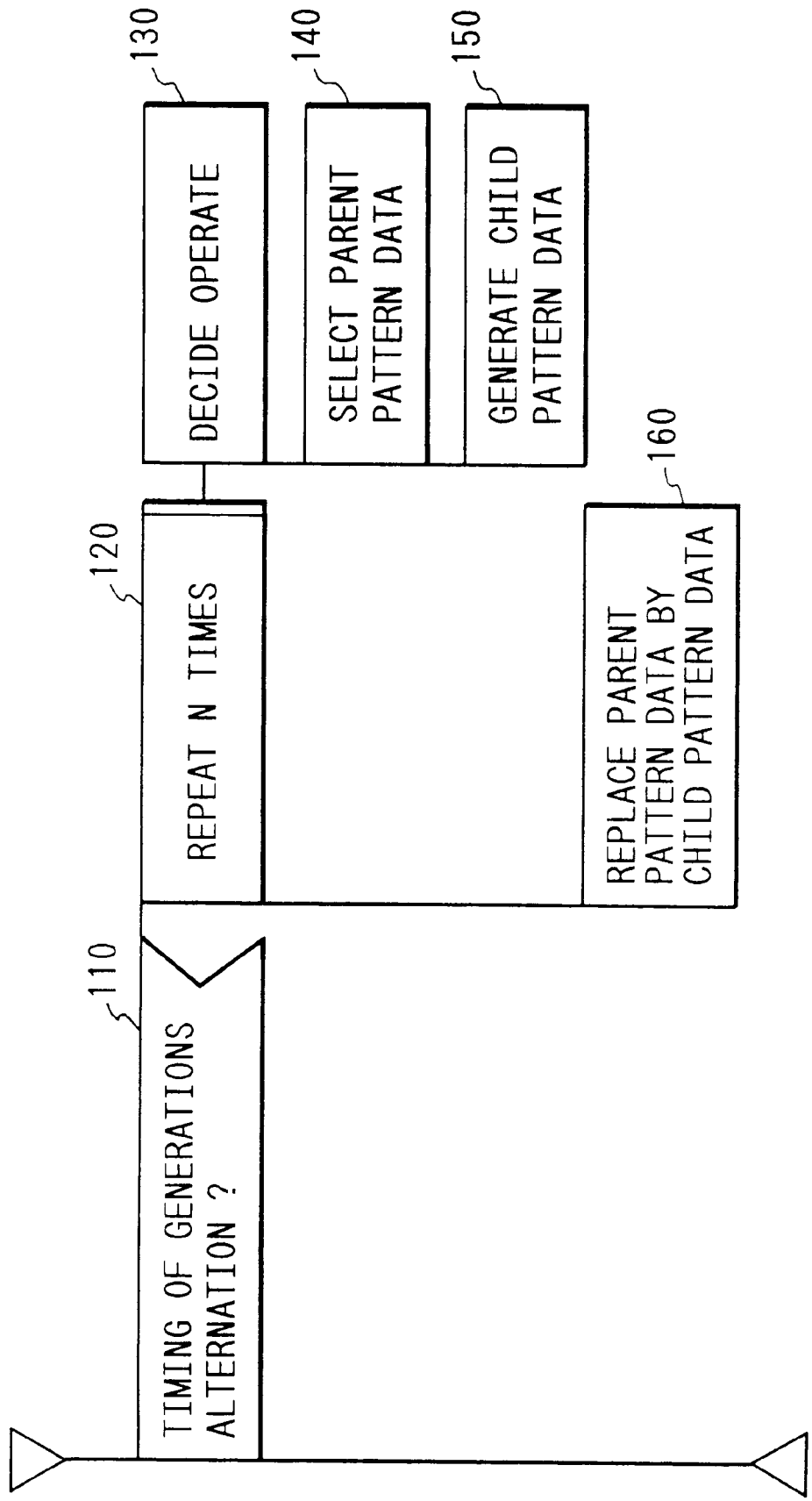
FIG. 7 is a flow diagram illustrating procedures of still another embodiment of the present invention.

The second embodiment is a constructional example of the detail approximating arrangement 52 with use of a so-called genetic algorithm. An entire system configuration of the second embodiment is shown in FIG. 1. FIG. 6 depicts a block diagram illustrating detailed configuration of the dictionary editing arrangement 5-2 in FIG. 1. FIG. 7 depicts a block diagram illustrating detailed configuration of the dictionary editing arrangement 5-2 in FIG. 1. FIG. 7 depicts a flow diagram illustrating procedures of the dictionary editing arrangement 5-2.

The dictionary editing arrangement 5-2 in the second embodiment comprises a adaptability memory 21, a parent pattern selecting device 22, a child pattern generating device 23, an operate deciding device 24, a child pattern device 25, a generations alternating device 26, and signal lines for interconnecting them. These devices are formed of, for example, electronic devices, such as a CPU, a ROM, a RAM, CMOSes, and software stored in the ROM.

The following describes functions of the component devices of the second embodiment.

The adaptability memory 21 holds adaptabilities fi of pattern data i entered in the dictionaries 2.

The "adaptability fi" is high as it is used frequently for character recognition. The "adaptability fi" also is an index of indicating similarity in a result of the process with use of the matching evaluation function that is the one of the recognizing arrangement 4. The "adaptability fi" further is a kind of parameter that is high as a "similarity" is high and as a range of the group attribute is wide. For example, the adaptability fi of data of a group is higher than those of an individual member since the data are used by more users. If the other conditions are same, in general, a pattern belonging to a user has higher adaptability fi than that of a group, and a pattern belonging to larger group has higher adaptability fi than that of a smaller group.

If a character pattern belonging to another category is entered and wrongly recognized as first candidate, its adaptability fi should be determined to lower value.

Values of the adaptabilities fi may be limited so that as an example, sum of the adaptabilities fij of the same category j should be made a certain value.

It is preferable that the adaptability fi should be stored in the dictionaries 2 shown in FIG. 1 as one attribute of the pattern data.

The generations alternating device 26 serves to set a timing and update the data of the dictionaries 2 at the timing. The timing should be a time at which a certain condition is met, for example, dictionary updates by a user accumulate to some amount since the preceding time.

The term "alternation of generations" is originated in the fact that as the dictionaries 2 are updated, number n of patterns entered in the dictionaries 2 are replaced by number m of different patterns as if number n of parents are generation alternated by number m of children.

The patterns before replacement are hereinafter referred to as the parent patterns, and the patterns after replacement as the child patterns.

The generations alternating device 26 updates the data of the dictionaries 2 in the way that it feeds a generations alternation signal to the signal line 304 to generate the chide patterns in the child pattern device 25 before deleting the parent patterns from the dictionaries 2 through the input arrangement 101 to enter the child patterns.

In turn, the parent pattern selecting device 22 in FIG. 6 has the category j designated through the signal line 304 and has number of the patterns designated through the signal line 301 by the child pattern generating device 23. The parent pattern selecting device 22 then looks the data of the dictionaries 2 in FIG. 1 to select pattern data of the designated number from among the pattern data having the attribute of the category j.

Probability of selection of pattern data ij depends on the adaptability fi, being given by $$f_i / \Sigma f_{ij}$$

where $\Sigma$ is summation with respect to all i's.

The child pattern generating device 23 receives timing data of generations alternation from the signal line 301. The child pattern generating device 23 also receives operates, including copy, cross-over, and mutation, and number n of parameters through the signal line 302. The child pattern generating device 23 then feeds the number of parameters to the signal line 301 before receiving the number n of parent patterns from the parent pattern selecting device 22.

Then, the child pattern generating device 23 executes an operate of the parent pattern data to generate new child data, including adaptabilities, before feeding them to the signal line 303. The copy of the operates is to copy one parent pattern to generate one child pattern. The cross-over is to transcript partial features of two parent patterns to generate one child pattern. The mutation is to generate a child pattern a feature of which is different from that of the parent pattern. Those operates will be described later in detail.

The operate deciding device 24 feeds an operate command and number of parameters to the signal line 302.

The number of parameters is decided by the operate. Probability of operate k to be fed out depends on a predetermined probability.

The child pattern device 25 holds the new pattern data, including the adaptabilities, received through the signal line 303.

FIG. 7 depicts a flow diagram illustrating procedures of the dictionary editing arrangement 5-2.

Step 110 makes the generations alternating device 26 inform the timing of generations alternation in a certain time. It is preferable that the timing is set when the generations alternating device 26 detects occurrence of change of situation, such as entering new characters into the dictionary by user, or when characters belonging to a category are recognized not less than a predetermined number of times.

The following processes are executed by category.

Step 120 repeats the following process N times to generate N child patterns.

Step 130 makes the operate deciding device 24 select one of the operates, including (1) copy, (2) cross-over, and (3) mutation, to decide. The selection is made depending on probabilities of (1) copy, (2) cross-over, and (3) mutation which are, for example, 0.5, 0.495, and 0.005, respectively.

Step 140 selects parent pattern data. However, numbers of the parent pattern data are different depending on kind of operate. For example, numbers of the parent pattern data of (1) copy, (2) cross-over, and (3) mutation are 1, 2, and 0, respectively.

A decision rule of selecting a pattern as parent pattern is that the pattern is selected at high probability as its adaptability is high.

Step 150 generates a child pattern data on the basis of the operate and the parent pattern.

Now, the following describes the copy, the cross-over, and the mutation of the operates.

(1) The copy is an operate that duplicates the parent pattern data as it was to generate child pattern data.

(2) The cross-over is an operate that takes two parts out of each of sets, for example, two sets of parent pattern data before combining them to generate a pattern as child pattern data.

It is preferable that a point of the cross-over should be at cut of 'bushu' (parts) of a kanji or cut of strokes of a pattern other than the kanji.

(3) The mutation is an operate that replaces parts of the parent pattern data by those of the pattern data belonging to another category to generate new character data.

After the N child patterns are generated, step 160 replace the parent pattern data by the child pattern data. In general, it is preferable that number of the parent pattern data equal to that of the child pattern data.

Figure 8:
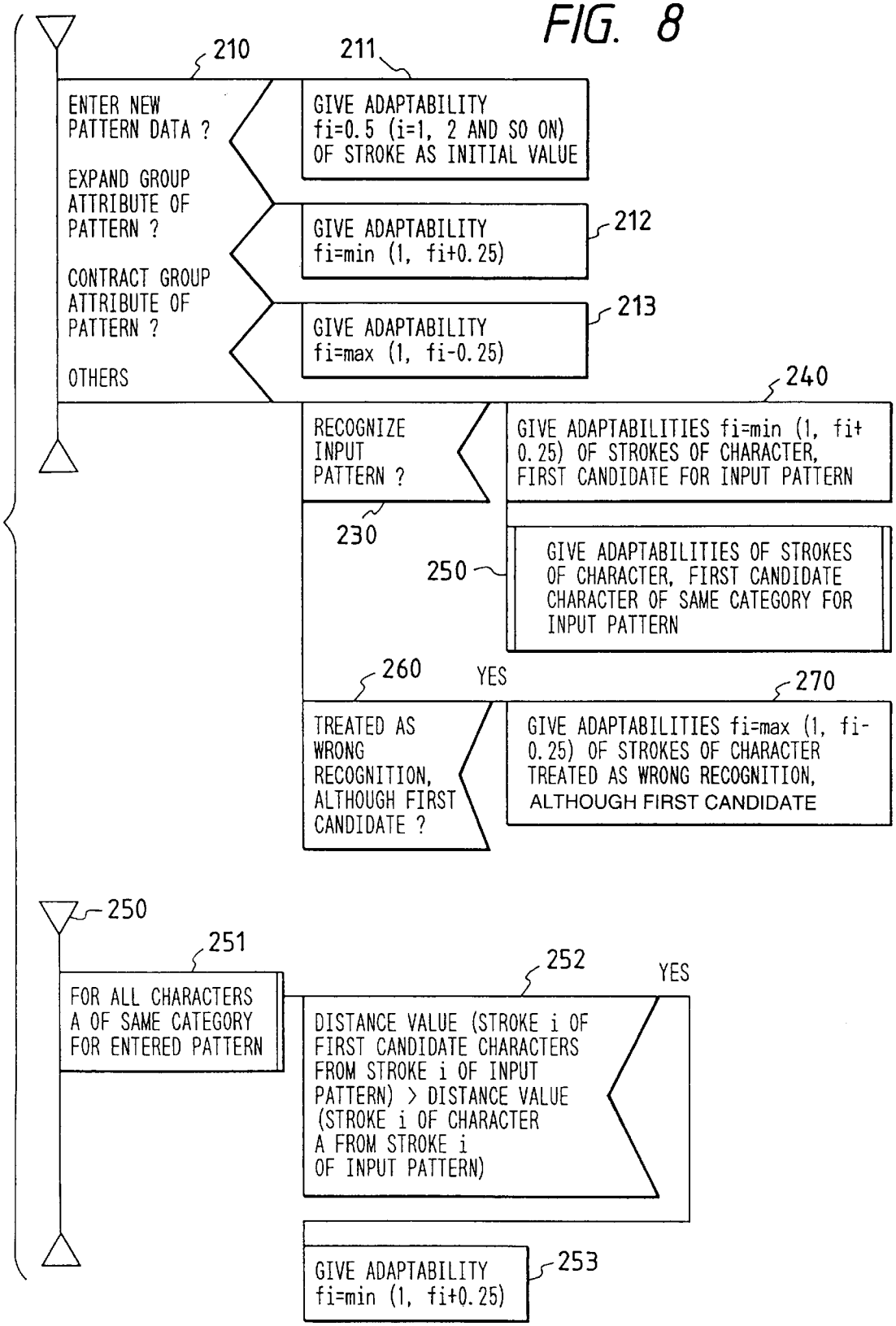
FIG. 8 is a flow diagram illustrating procedures of giving an adaptability fi.

In turn, the following describes how to give the adaptability by reference to FIG. 8.

The adaptability is updated in cases of steps 210, 230, and 260 in the figure. It is assumed here that the adaptability is given to each of strokes (kaku) of a single pattern. (Each kaku is a dot or line forming a character.) As an example, the following describes decision of the adaptability of a whole pattern formed of strokes on the basis of the adaptabilities given to their strokes.

If a user enters a new pattern, step 211 give an adaptability fi of 0.5 to each stroke.

If an attribute belonging to the pattern is changed, particularly extended, step 212 gives an adaptability to the pattern by an equation below so that also the adaptability can be made higher.

$$fi=min(1, fi+0.25)$$

where min(a, b) is a function of selecting smaller one of a and b.

If the attribute is reduced, step 213 gives an adaptability to the pattern by an equation below so that also the adaptability can be made lower.

$$fi=man(1, fi-0.25)$$

where man(a, b) is a function of selecting larger one of a and b.

Of course, the processes at steps 212 and 213 may not be made.

If step 230 recognizes the entered pattern, step 240 gives to the entered pattern an adaptability of each stroke of the first candidate character by the equation below $$fi=min(1, fi+0.25).$$

Further, step 250 gives to the entered pattern the adaptability of each stroke of the first candidate character that is also a character belonging to the same category.

If a give one of all characters a belonging to the same category conforms to a reference given in step 252, that is, if there exists a stroke of smaller distance value to the entered pattern than the first candidate character, step 251 gives to the entered pattern an adaptability by the equation below $$fi=min(1, fi+0.25).$$

The term "distance value" is a function value of the matching function operated between the entered pattern and the dictionary pattern in the dictionaries. For example, if the pattern feature is represented by coordinates approximated by N points and if the matching function is represented by sum of differences of the approximated coordinates of the entered pattern and the dictionary pattern, then the sum is distance value.

If the character is the first candidate in step 260, but treated as wrong recognition, then step 270 gives an adaptability to the pattern by $$fi=man(1, fi-0.25).$$

It is preferable that for ease of process, a kanji pattern should rather have the adaptabilities given to subpatterns, such as parts, as units than the ones given to the strokes.

FIGS. 9 and 10 depicts handwritten figures illustrating examples of updating the dictionary pattern of a category "*a" that is a category for a character pattern "*a".

FIG. 10 shows examples of the child patterns generated by the copy, the cross-over, and the mutation on the basis of the parent patterns.

As shown in FIG. 9, if the dictionary has seven kinds of character pattern "*a" (patterns 1 p1 to p7) entered therein and if the copy of operate is selected at probability of 0.5 by the operate decision in the generations alternation, the pattern p1 is selected at a probability (Adaptability of p1)/(Adaptability of Σpi)

where Σ is summation with respect to all i's. Thus, the child pattern pc1 is generated.

The adaptability of pi is obtained in terms of the adaptabilities given to the strokes. For example, the adaptability should be obtained by averaging the adaptabilities given to the strokes.

As an example, the adaptabilities given to the strokes, as shown in FIG. 9, are 1, 1, and 1, respectively.

Therefore, the adaptability of pi is given below.

Adaptability of $pi=(1+1+1)/3=1.$

Similar process is repeated for p2 to p7. Their adaptabilities then are 0.5, 1, 1, 0.5, 0.5, and 0.25.

Therefore, the probability of selection of p1 is given below

Probability of selection of p1=1/(0.5, 1, 1, 0.5, 0.5, and 0.25)=0.266.

Similarly, operates and parent patterns are selected at probabilities depending on the adaptabilities before being operated by the copy and cross-over to obtain pc2 and pc3 as shown in FIG. 10.

As described so far, the processes of the first and second embodiments can be used for pattern recognitions of not only characters, but also figures, voices, and others.

If the dictionaries 2 are classified into categories, such as kinds of characters, operation of the dictionary editing arrangement 5-2 can be switched for each category. That is, a dictionary of the category that is highly common among the users is positively optimized, but the other dictionaries are not made. In the character recognition, for example, the hiragana are dictionary-optimized, but the other kinds of characters are not made.

Even for code strings of entered patterns, such as kana-kanji conversion, the present invention can be used similarly with the following three changes.

(1) The recognizing arrangement 4 is replaced by a kanji converting arrangement 4.

(2) The data in the dictionaries 2 are replaced by definitions of conversion code strings for the entered code strings.

(3) The input arrangement 1 is replaced by other kind of input arrangement 1 and a display arrangement 6.

If the kanji converting arrangement 4 used for the recognizing arrangement 4 receives the entered code string and attributes, such as group, through the signal line 100, it looks the dictionaries 2 through the input arrangement 101. It then retrieves the entered code string in the dictionary having the attributes, such as group. It then feeds the conversion code string for the entered code string to the signal line 100.

The dictionary editing arrangement 5-2 is a heart of the present invention.

The dictionary editing arrangement 5-2 detects a superior part of a user dictionary before making process so that the part can be made available by all the users of the group. The process can be accomplished by the configuration in FIG. 4 and the operation in FIG. 5 as with the first embodiment.

The term "superior part" is defined as the entered data if the kana-kanji conversion pattern used in common by the members of the group as an example since it is an agreement of the group is entered in the user dictionary of a member.

For example, if there is a kana-kanji conversion pattern common to the data entered in the user dictionary, the common pattern is extracted as the superior part to allow all the users, members of the group, to use it.

Figure 11:
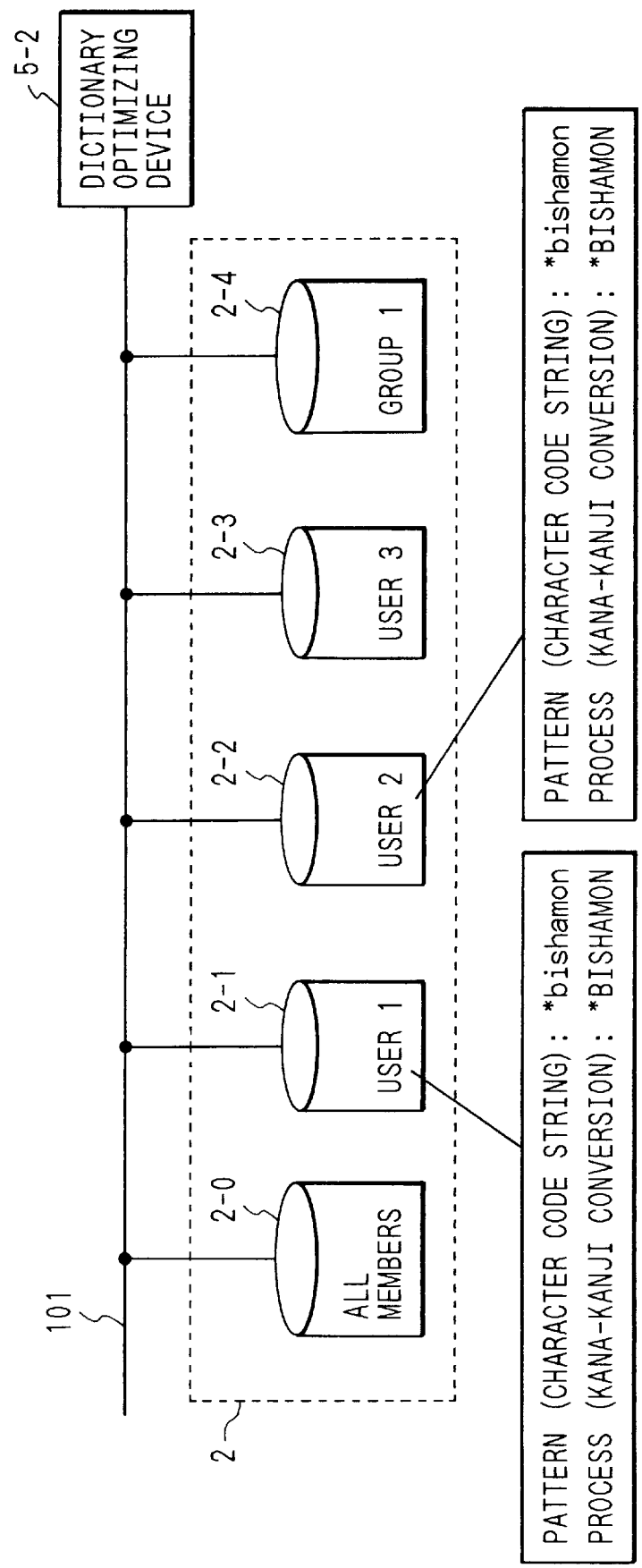
FIG. 11 is a block diagram illustrating a learning with use of a dictionary.
Figure 12:
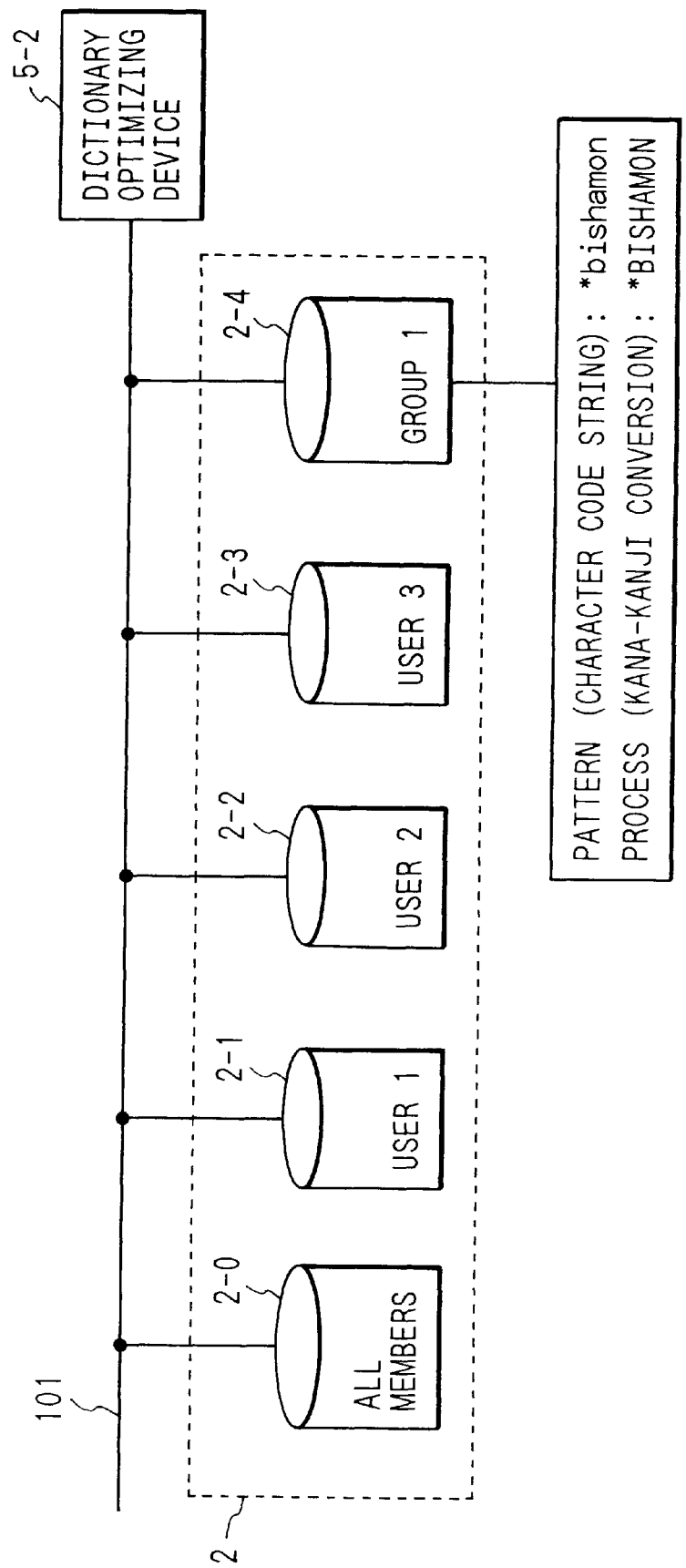
FIG. 12 is a block diagram illustrating a learning with use of a dictionary.

FIGS. 11 and 12 depict block diagrams illustrating examples of the process of the kana-kanji converting arrangement. As in the first embodiment, the data of the dictionary are classified into "all members" 2-0, "user 1" 2-1, "user 2" 2-2, "user 3" 2-3, and "user 4" 2-4. (The users in the first embodiment are members of the group that use the system.) Of course, the data of the dictionary may be classified by attribute of kind of character or similar attributes.

FIG. 11 depicts a block diagram illustrating a state in which two users entered the same specific term individually with the dictionary editing arrangement 5-1.

In FIG. 12, the dictionary editing arrangement 5-2 starts from the state in FIG. 11 extracting as the agreement of the group that the kana-kanji conversion of a character code string "bishamon" should be made to "*BISHAMON." The dictionary editing arrangement 5-2 then enters the agreement in the group dictionary that can be used by all the users of the group before deleting it from the two user dictionaries. Alternatively, the agreement may be entered in all the user dictionaries of the group.

The embodiment in which the entered pattern is the code string was described above with the example of kana-kanji conversion. Also, the present invention can be applied similarly to define a system operation on the basis of the patterns and dictionaries having the patterns entered therein. That is, if two or more members of a group rewrite the user dictionaries to customize the system operation for higher operationability, all the members of the group can obtain the customized operationability.

The pattern data processing system of the present invention, unlike the above-described first embodiment, can be configured to have a plurality of handwriting input stations connected by a network, each input station having the input arrangement 1, the dictionary 2, the main memory 3, and the recognizing arrangement 4 integrated together.

The following embodiments are described below with the example of kana-kanji conversion. The present invention also can be applied to the pattern recognition system except for the above-mentioned changes (1), (2), and (3). The present invention further can be applied to the definitions of the system operation.

The following describes a third embodiment of the present invention that is a method of looking the other user dictionaries without the group dictionary.

Figure 13:
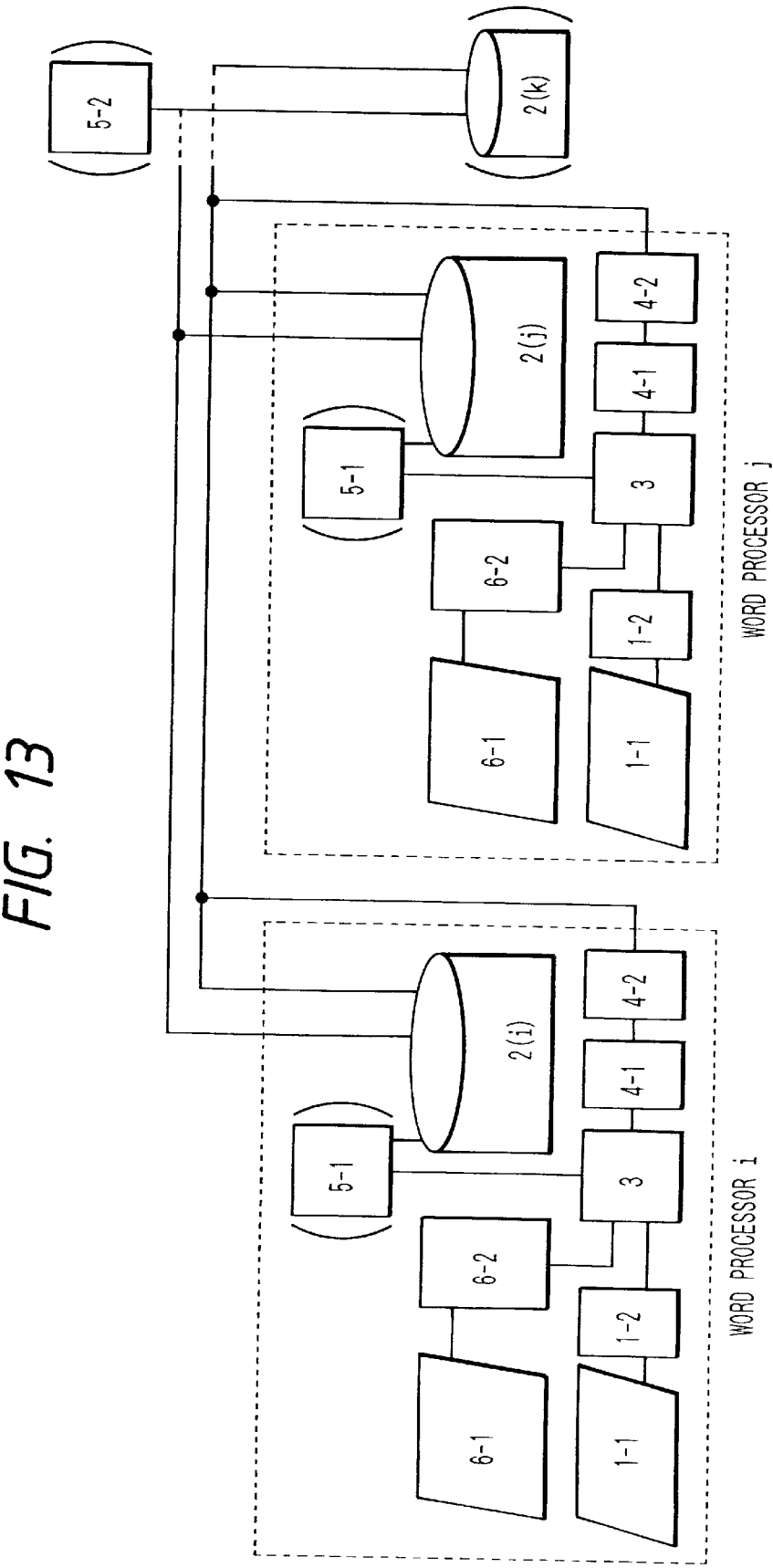
FIG. 13 is a block diagram illustrating a system configuration of a third embodiment of the present invention.

FIG. 13 depicts a block diagram illustrating a system configuration of the third embodiment. In the figure, a word processor comprises an input arrangement 1, a display arrangement 6, a main memory 3, a kana-kanji converting arrangement 4, and a dictionary 2. The input arrangement 1 has an input arrangement 1-1 and an input arrangement 1-2. the display arrangement 6 has a display arrangement 6-1 and a display arrangement 6-2, and the kana-kanji converting arrangement 4 has a processing device 4-1 and a dictionary look-up device 4-2. The word processor may be made to have an additional dictionary editing arrangement 5-1 to enter some specific terms for use of the user himself or herself.

The input arrangement 1 to have the pattern of input code string is ordinarily a keyboard. Alternatively, the input arrangement 1 may be a mouse that is to make selection from a code menu. Instead, the input arrangement 1 may be the pattern recognition system described with the first embodiment above that has the code strings entered thereto, the code strings being of the recognized handwritten characters, without the display arrangement 6. The input arrangement 1 may be still another device capable of having the code strings entered thereto.

Figure 14:
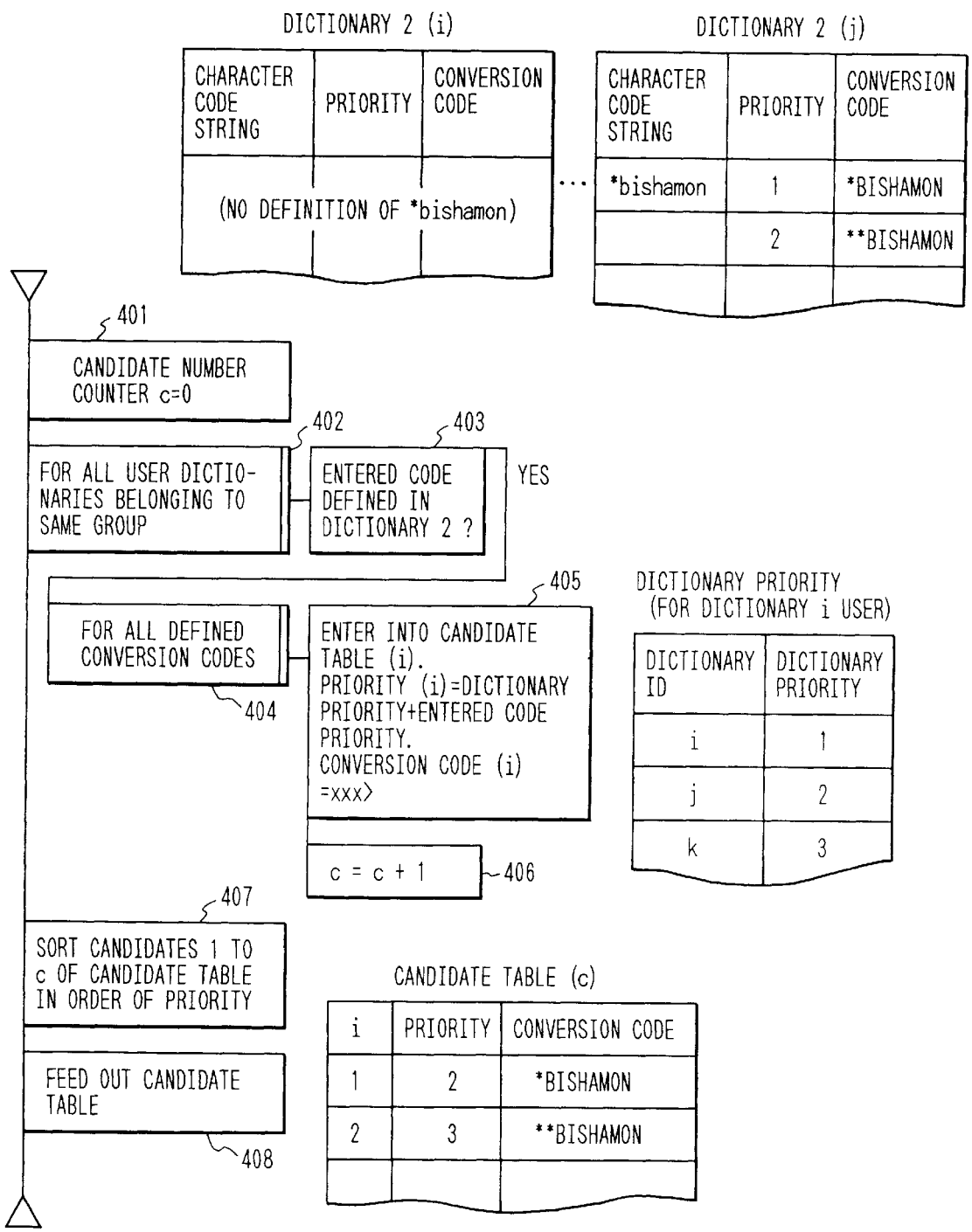
FIG. 14 is a flow diagram illustrating operation procedures of the present invention.

The dictionary 2 has the input code strings and a plurality of conversion code strings for them with priorities (see dictionary 2 (j) in FIG. 14). The dictionary 2 may not have an attribute of owner thereof if the word processor provided for each user as in the system configuration in FIG. 13 has an ID thereof, while the system of the first embodiment has the attribute of owner of the dictionary 2 has defined therein.

As described above, the kana-kanji converting arrangement 4 has a processing device 4-1 and a dictionary look-up device 4-2. The processing device 4-1 receives through the main memory 3 the input cord strings entered with the input arrangement 1 by the user. The processing device 4-1 then cuts a single word out of the input cord strings before sending it to the dictionary lookup device 4-2.

The dictionary look-up device 4-2 searches the dictionary 2 for the input code strings of the single word. As the dictionary 2 of each workstation system is connected to the network, the dictionary look-up device 4-2 searches the dictionaries, including the ones of the word processors, for the input code strings. Since the input code strings may have a plurality of conversion code strings defined therefor, the dictionary look-up device 4-2 sets the priorities before sending the conversion code strings to the processing device 4-1.

FIG. 14 depicts a flow diagram illustrating operation procedures of the dictionary look-up device 4-2. First, step 401 initializes a candidate counter c to 0. Step 402 repeats the following processes of all the user dictionaries belonging to the same group. The processes should be made in the order of a dictionary priority table provided as shown in the figure. If the dictionary having high dictionary priority has the conversion codes defined for the input code strings, the processes do not have to be made for all the user dictionaries belonging to the group, but may be broken off.

Examples of the dictionary of the user belonging to the group in FIG. 14 have definition fields for the input code string "*bishamon" in the dictionary 2 (i) of the word processor i and the dictionary 2 (j) of the word processor j. The dictionary 2 (i) has no definitions, but the dictionary 2 (j) has two conversion codes defined therein.

Step 403 checks whether the input code strings are defined in the dictionary 2 or not. If so, step 404 makes steps 405 and 406 proceed for all the defined input code strings. That is, the steps calculate the priorities of the input code strings, enter the priorities and the conversion codes in the candidate table (c), and update the candidate counter c. The priorities are used in the way that the dictionary priorities are decided in advance as shown in the figure and summed with the priorities of the conversion codes. Alternatively, the priorities may be calculated by use of products of multiplications or a priority function.

Step 407 sorts number c of the candidates entered in the candidate table in order of priority before feeding the candidates to step 408. That is, step 407 sends the candidate table sorted in order of priority to the processing device 4-1.

As the examples of candidate table are shown in FIG. 14, the user of the dictionary 2 (i) has no definitions in his or her own dictionary, but can obtain the conversion codes.

The processing device 4-1 can have a result of the kana-kanji conversion having the highest priority.

The display arrangement 6 displays the input code string entered with the input arrangement 1 by the user. After the code string is converted to kana-kanji string by the kana-kanji converting arrangement 4, the display arrangement 6 displays the kana-kanji converted character code string.

The dictionary editing arrangement 5-1 makes learning of kanakanji conversion for the individual user before editing the dictionary 2. That is, the dictionary editing arrangement 5-1 functions to learn the priorities of entering the specific terms and the code strings having been kana-kanji converted according to a history of the kana-kanji conversion.

In turn, the following describes a fourth embodiment of the present invention. The fourth embodiment, like the abovedescribed first embodiment, has the group dictionary, but has the input arrangement 1, the dictionaries 2, the main memory 3, and the kana-kanji converting arrangement 4 (or the recognizing arrangement 4 for handwriting input) integrated together.

Such a system configuration has the following additional devices provided to that of the above-described second embodiment. That is, the fourth embodiment has an additional dictionary editing arrangement 5-2 and group dictionary 2 (k). The dictionary editing arrangement 5-2 and the group dictionary 2 (k) are same as the ones used in the above-described first embodiment. Procedures of the dictionary editing arrangement 5-2 are made in the same flow of FIG. 5 as that of the first embodiment.

In turn, the following describes a fifth embodiment of the present invention. The fifth embodiment has no group dictionary, but is a method that data of a dictionary are distributed to the other dictionaries.

Figure 15:
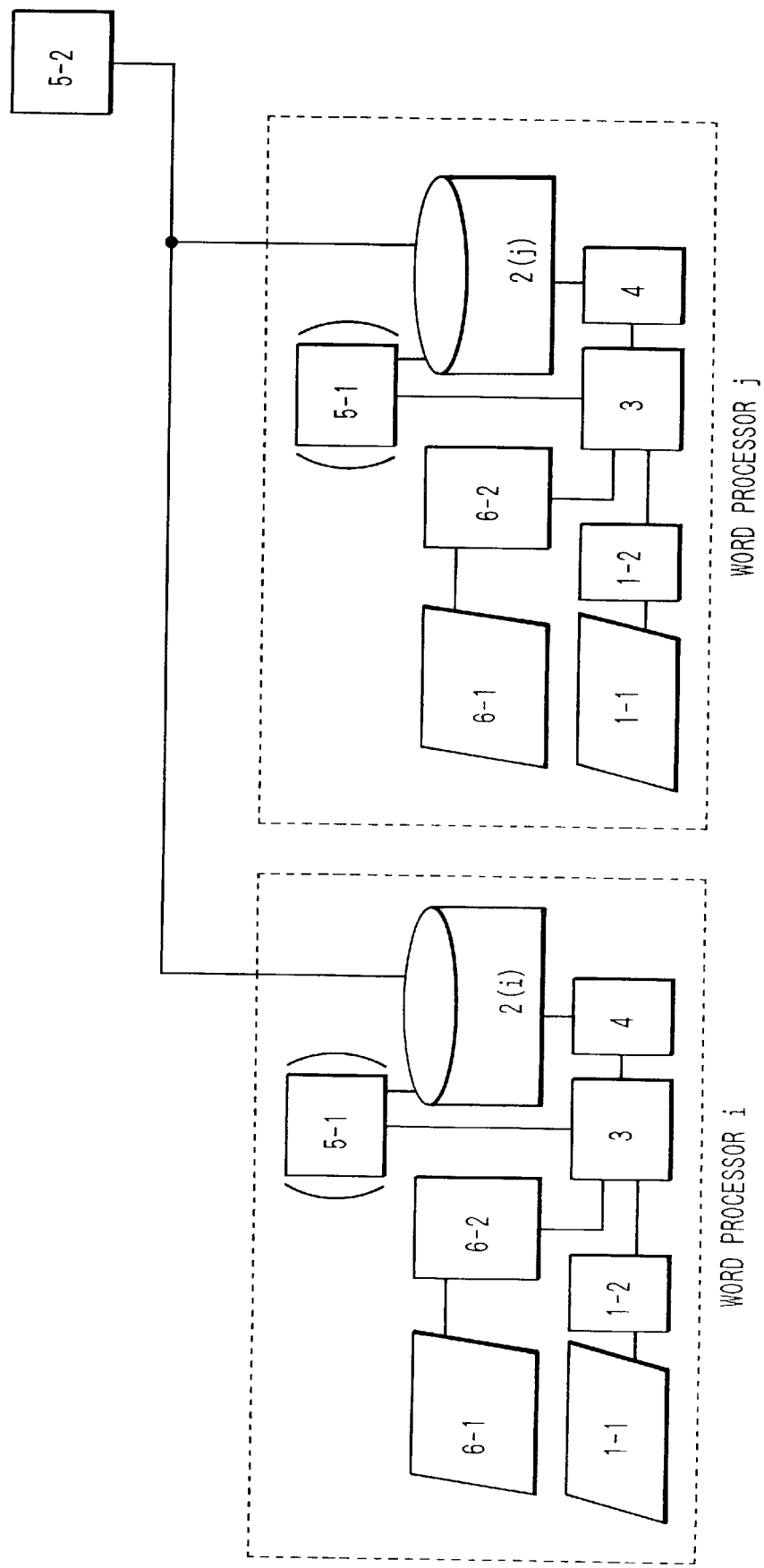
FIG. 15 is a block diagram illustrating a system configuration of a fifth embodiment of the present invention.

FIG. 15 depicts a block diagram illustrating a system configuration of the fifth embodiment. The fifth embodiment has no elaboration of the recognizing arrangement 4-2, while the word processor of the above-described second embodiment in FIG. 13 had the recognizing arrangement 4-2 elaborated to look the dictionaries of the other users. The range correspondence arrangement 53 has the ordinary kana-kanji converting arrangement 4 only for looking the dictionary of the word processor.

Figure 16:
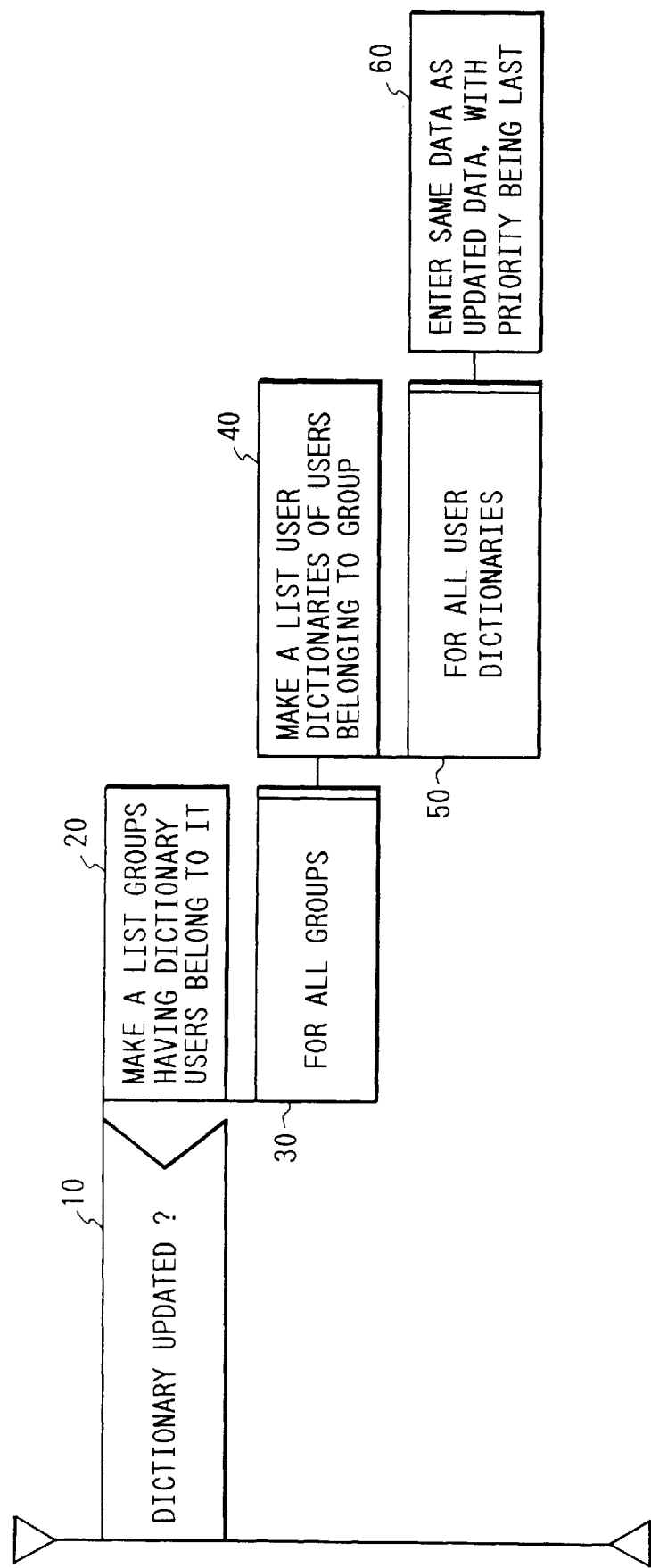
FIG. 16 is a flow diagram illustrating operation procedures of the present invention.

The fifth embodiment has a dictionary editing arrangement 5-2 provided therein specifically for distributing the data of the dictionary to the other dictionaries. FIG. 16 depicts a flow diagram illustrating operations of the dictionary editing arrangement 5-2.

Step 10 watches the dictionaries for update. If any of the dictionaries is updated, the following processes are made. Step 20 makes a list of groups having the users of the updated dictionaries belong thereto. The following processes are made for all the groups. Step 40 makes a list of user dictionaries of the users belonging to the groups. Step 50 makes step 60 for all the user dictionaries. That is, step 60 enters the same data (conversion codes for the input code strings) as the updated data. It should be noted that since the conversion codes may be already entered for the input code strings, step 60 should add priorities to the conversion codes for the input code strings, and the conversion codes of the updated data should have the lowest priority.

In turn, the following describes a sixth third embodiment of the present invention. The sixth third embodiment is a method that the word processor has the dictionary editing arrangement 5-2 provided therein to copy data of a dictionary to the own dictionary.

Figure 17:
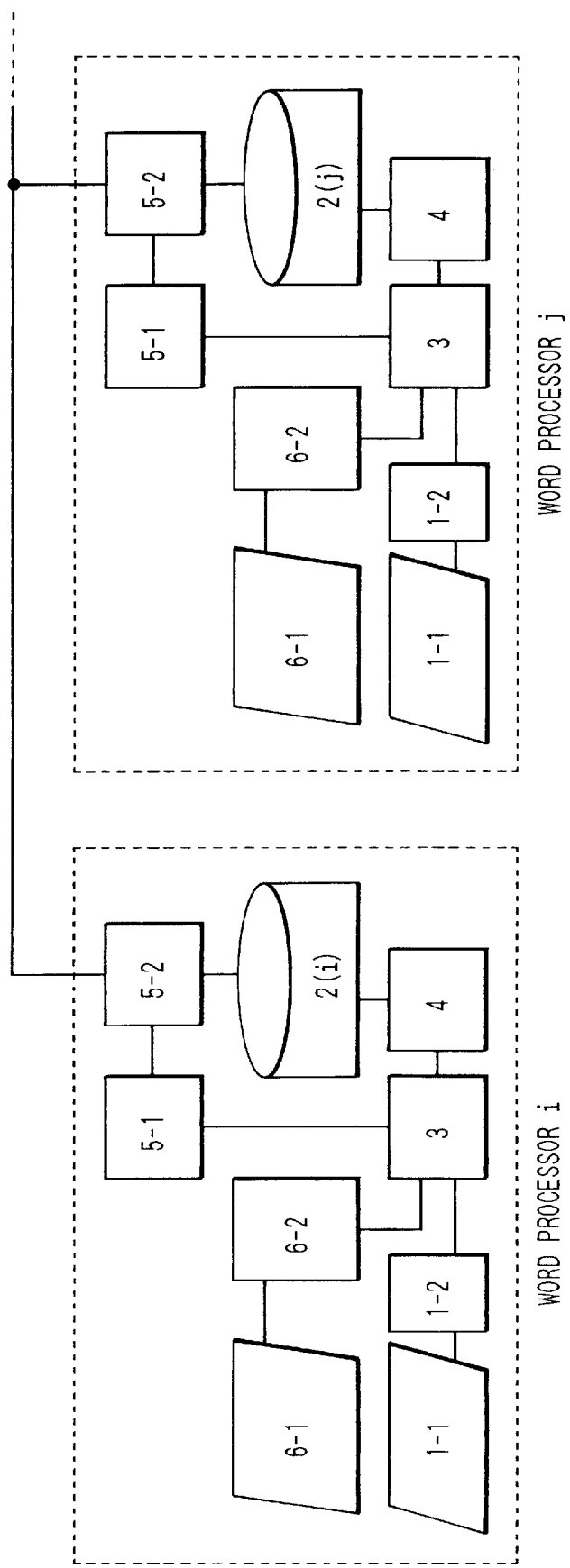
FIG. 17 is a block diagram illustrating a system configuration of a sixth third embodiment of the present invention.
Figure 18:
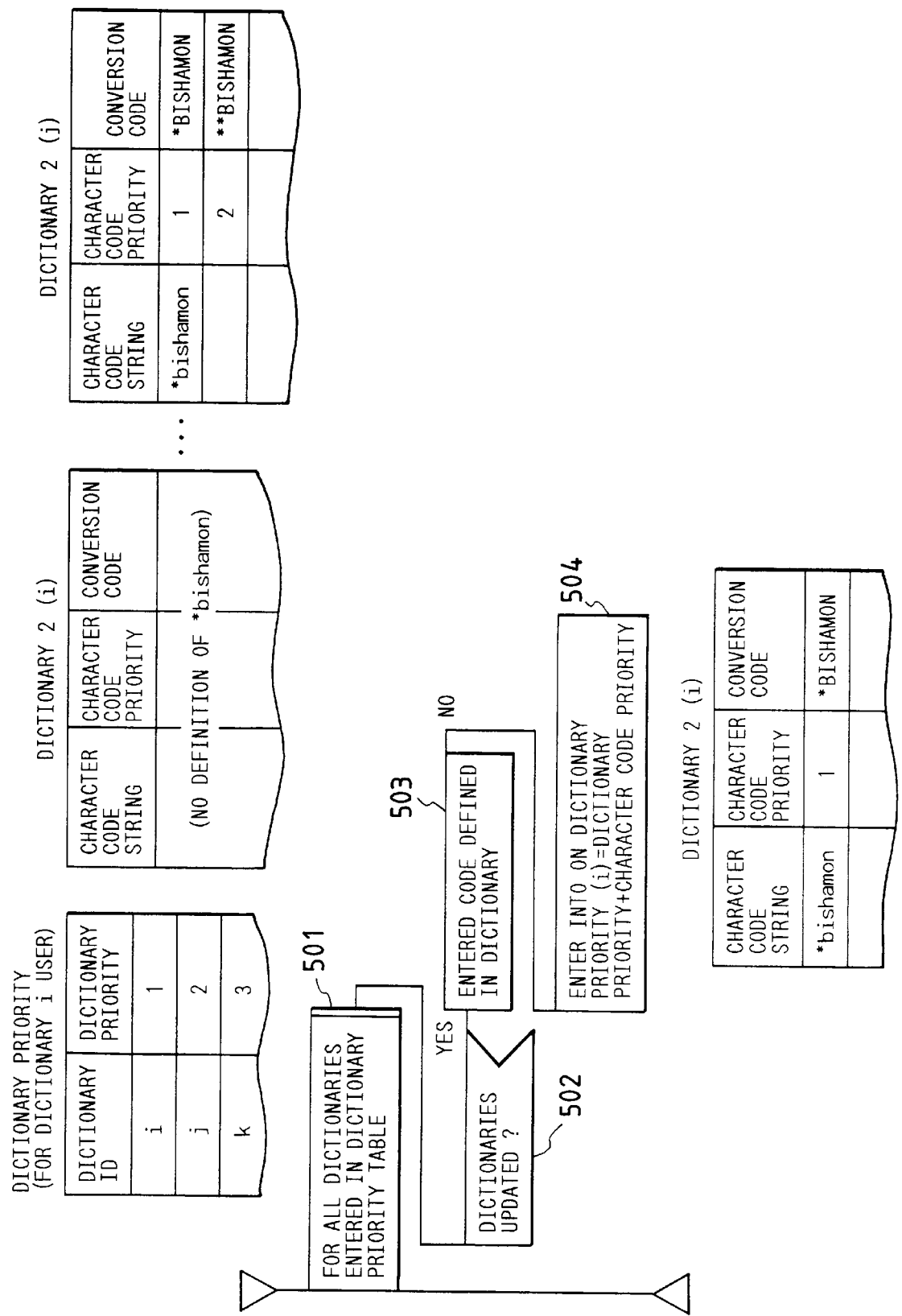
FIG. 18 is a flow diagram illustrating operation procedures of the present invention.

FIG. 17 depicts a block diagram illustrating a system configuration of the sixth third embodiment. The sixth third embodiment has the dictionary editing arrangement 5-2 described in FIG. 15 of the fifth embodiment provided in the word processor. FIG. 18 depicts a flow diagram illustrating operations of the dictionary editing arrangement 5-2.

First, step 501 repeats the following processes for all the other user dictionaries entered in a dictionary priority table. Step 502 watches the other dictionaries for update. If so, the following processes are made. Step 503 checks the own dictionary 2 whether the own dictionary 2 has the updated data of the other dictionaries already defined therein as to the input codes. If not, step 504 enters the updated data of the other dictionaries in the own dictionary. Priorities of the conversion codes are same as in the above-described third embodiment.

The figure has the data of each user dictionary 2 before and after the operation of the dictionary editing arrangement 5-2 shown therein. The user of the dictionary 2 (i) can obtain the conversion codes irrespective of no definitions in his or her own dictionary.

The following describes a seventh embodiment that is an example of on-line handwritten character recognition of the present invention in which the recognition accuracy can be increased even if an appropriate method is different depending on pattern, by reference to FIGS. 19 to 26.

Figure 21:
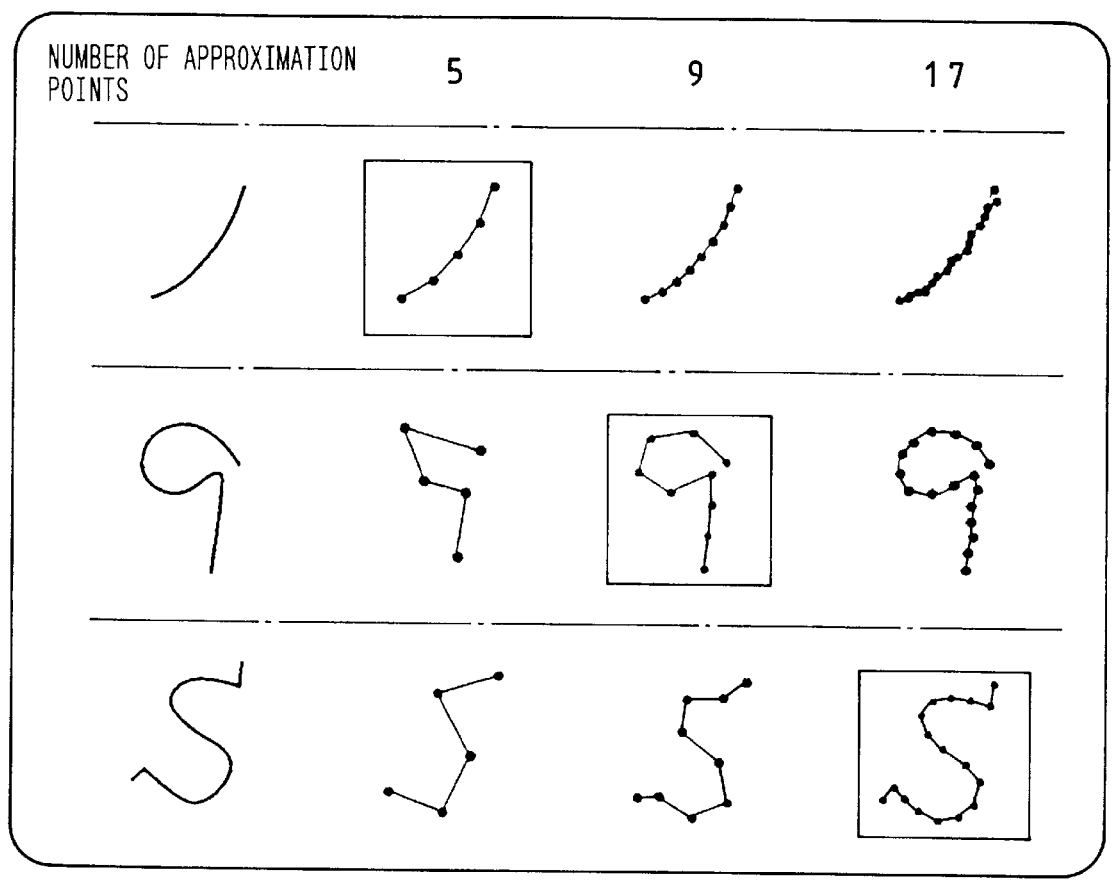
FIG. 21 is figures illustrating patterns with numbers of approximation points of which are different.

FIG. 21 depicts figures illustrating patterns of "*no," "9," and "S" numbers of approximation points of which are different. We can see that the patterns can be made nearly accurate to the original figures before approximation as the numbers of approximation points are increased. As the numbers of approximation points are increased too much, however, it takes long matching time. Also, some blur particular to handwriting may be adversely recognized. In the examples of the figure, optimum numbers of approximation points are five for "*no," nine for "9," and seventeen for "S." That is, the optimum number of approximation points is different depending on the feature of pattern. Each pattern therefore has to have a nearly accurate optimum number of approximation points.

Figure 22:
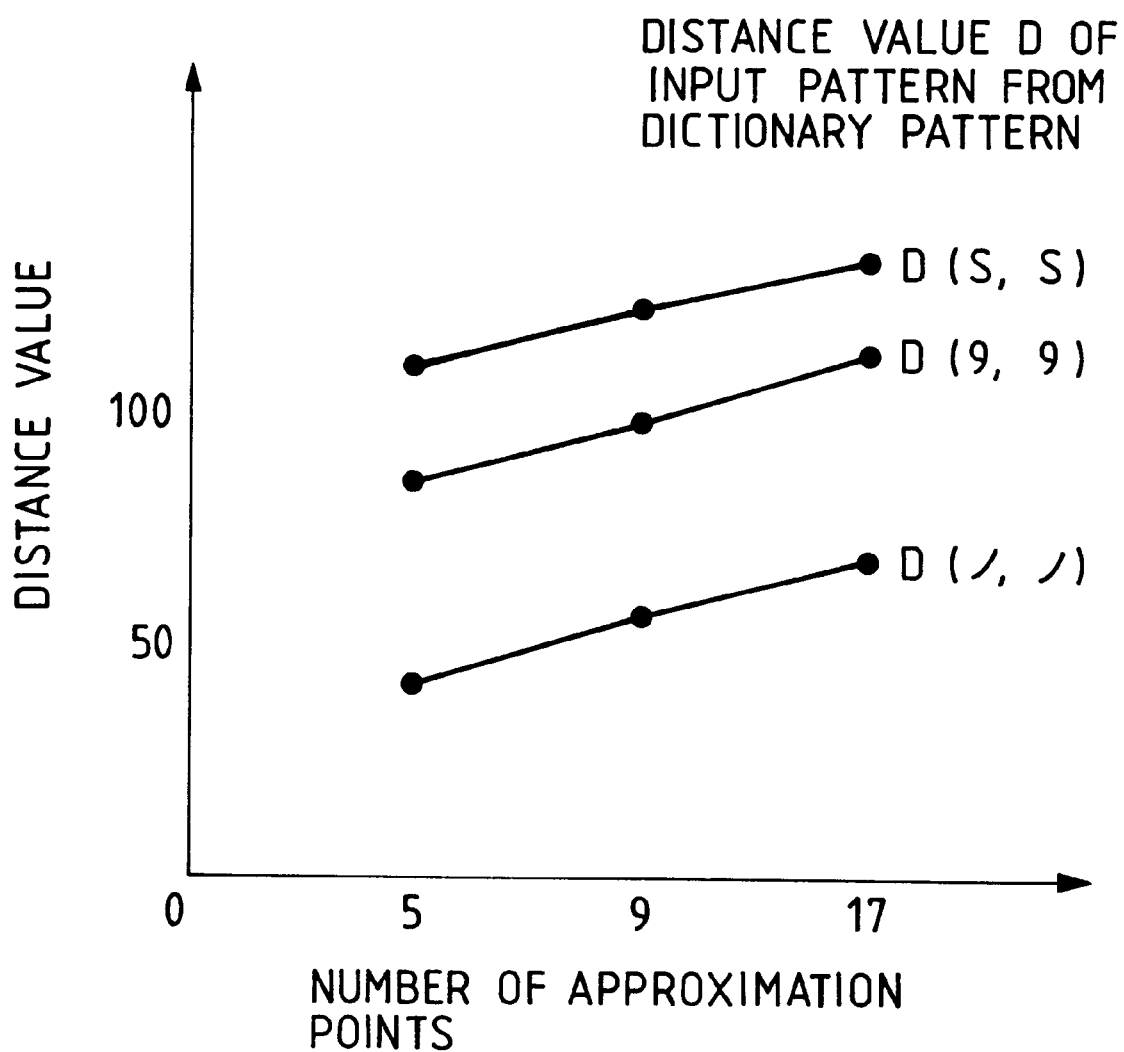
FIG. 22 is a graph illustrating examples of the distance values of the entered patterns and the dictionary patterns obtained with different approximating arrangements and different matching arrangements.

FIG. 22 depicts a graph illustrating examples of the distance values of the entered patterns and the dictionary patterns obtained with different approximating arrangements (of numbers of approximation points) and different matching arrangements. The examples are the distance values of the figures "*no," "9," and "S" with respect to the numbers of approximation points. We can see that the distance values are increased with the numbers of approximation points. We also can see that increases of the distance values are virtually constant with the numbers of approximation points. In reference to the distance values with five approximation points, the distance values are increased 10 with nine approximation points and 20 with seventeen approximation points.

As mentioned above, the optimum number of approximation points is different depending on the feature of pattern as can be seen in FIG. 21. In general, however, matching with many approximation points provide higher distance value than the one with less approximation points. We therefore can see that matching with many approximation points is disadvantageous with the distance values obtained if the optimum approximation points different depending on pattern are compared as they are. Hence, we can see that the matching time can be shortened and the recognition accuracy can be made high if the comparison is made after the distance values obtained with the numbers of approximation points are normalized.

Figure 19:
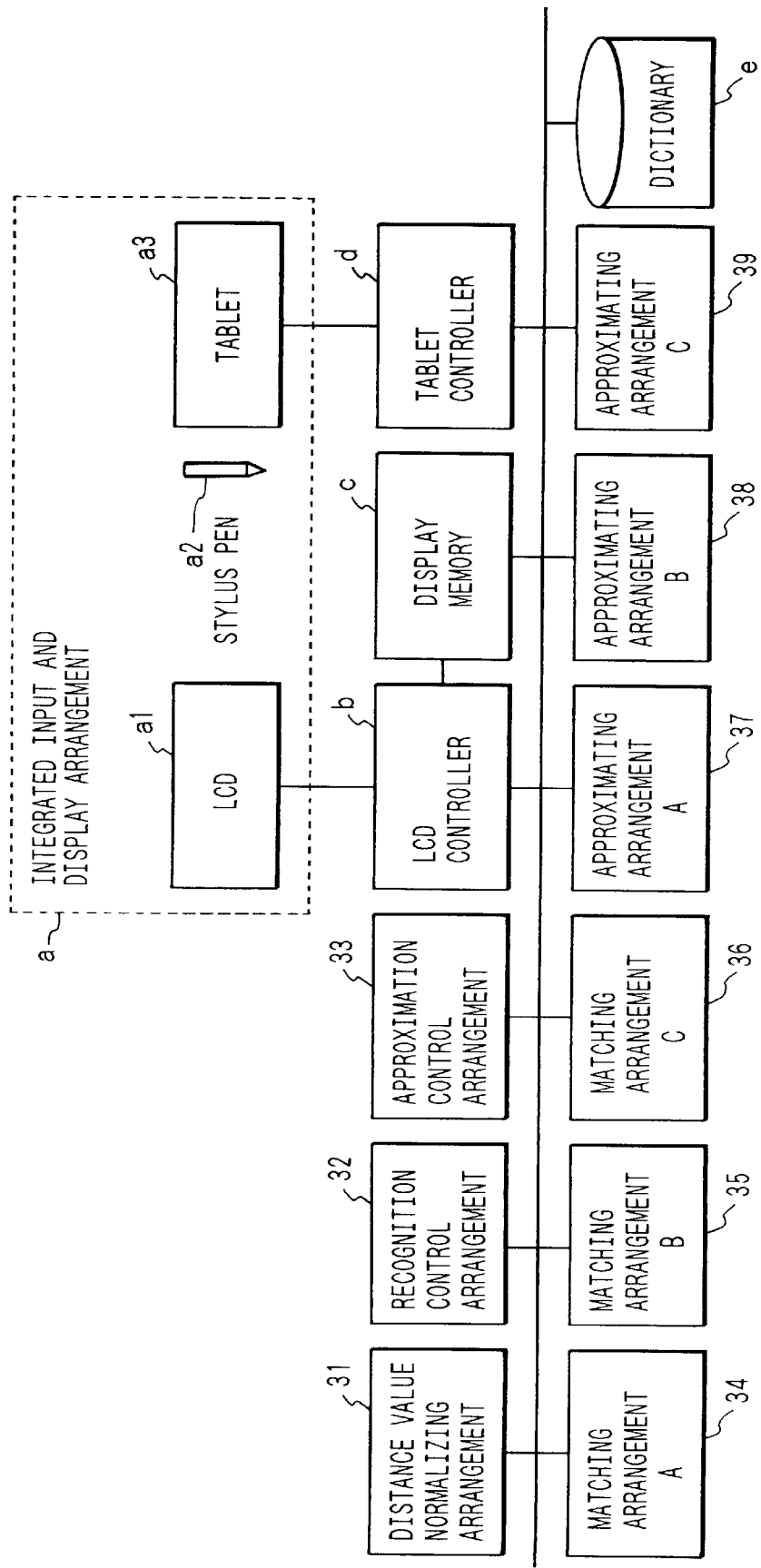
FIG. 19 is a block diagram illustrating functions of a variable approximation point pattern recognition system that is a seventh embodiment of the present invention.

FIG. 19 depicts a block diagram illustrating functions of a variable approximation point pattern recognition system that is the seventh embodiment of the present invention. Operation of the seventh embodiment is outlined below.

Strokes (handwritten data) can be entered by sliding a stylus pen a2 on a tablet (coordinates input device) a3. The tablet a3 sends the strokes to a recognition control arrangement 32. The recognition control arrangement 32 sends the strokes of one character to a approximation control arrangement 33. The approximation control arrangement 33 makes approximation of the strokes with optimum one of approximating arrangements A 37 to C 39 (of numbers of approximation points). The recognition control arrangement 32 then matches approximation (of numbers of approximation points) of the entered pattern with an appropriate dictionary pattern before obtaining distance values with an appropriate one of matching arrangements A 34 to C 36. The recognition control arrangement 32 then sends the obtained distance values to a distance value normalizing arrangement 31. The distance value normalizing arrangement 31 normalizes the distance values. The recognition control arrangement 32 then selects the lowest normalized distance as correct candidate before storing the character of the correct candidate in a display memory c. A LCD controller b reads the above-mentioned character from the display memory c before displaying the character on a display (LCD a1 here). Details of the operation of the seventh embodiment outlined above will be described later.

Figure 20:
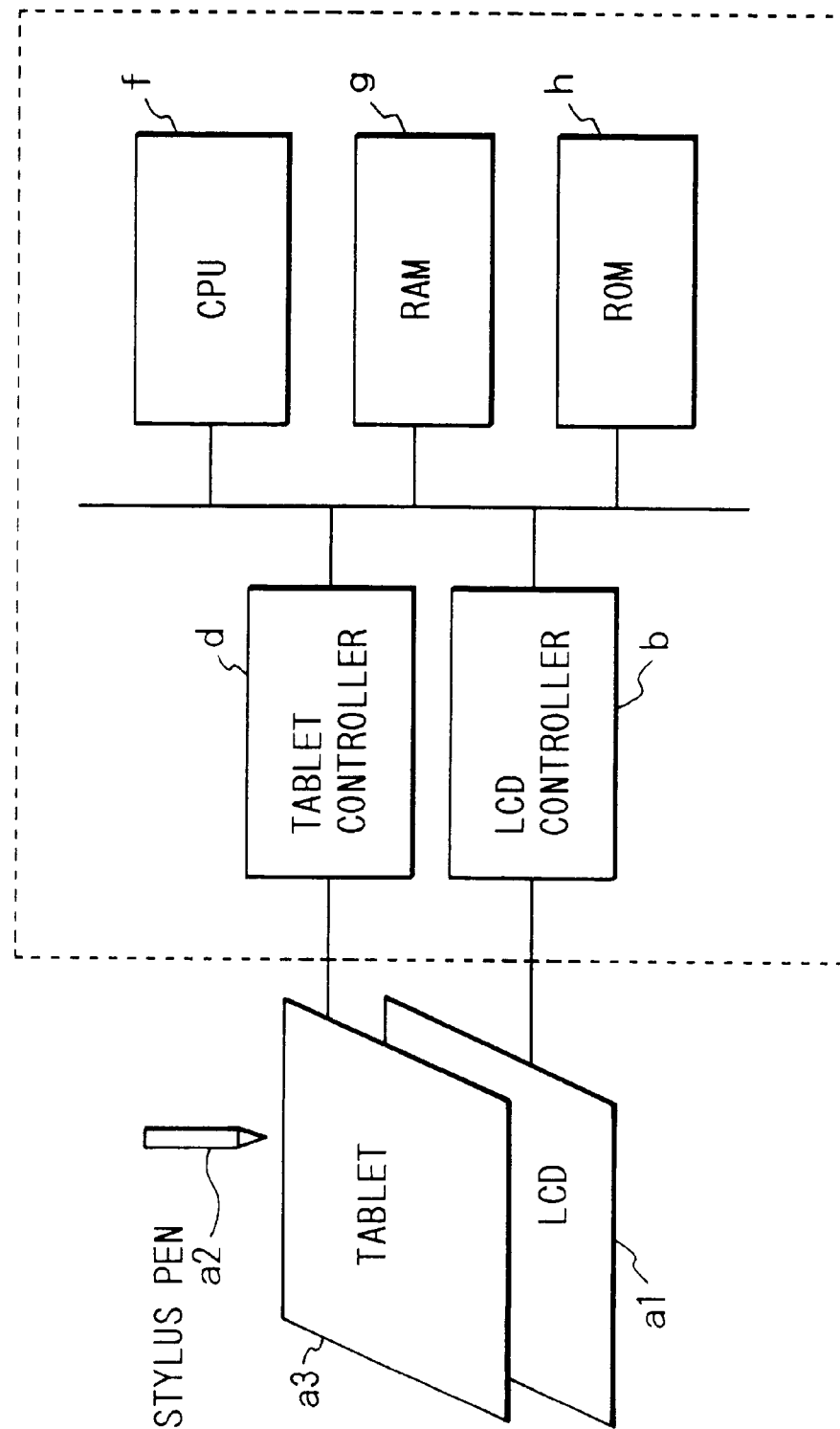
FIG. 20 is a functional block diagram illustrating a configuration of the present system.

FIG. 20 depicts a functional block diagram illustrating a configuration of the present system. The present system can accomplish the function of approximating a pattern, the function of matching it before calculating distance values, and the function of normalizing them in a way that a CPU f reads a program from, for example, a ROM h before executing it. The functions mentioned above will be described later in detail with use of flow diagrams.

Figure 23:
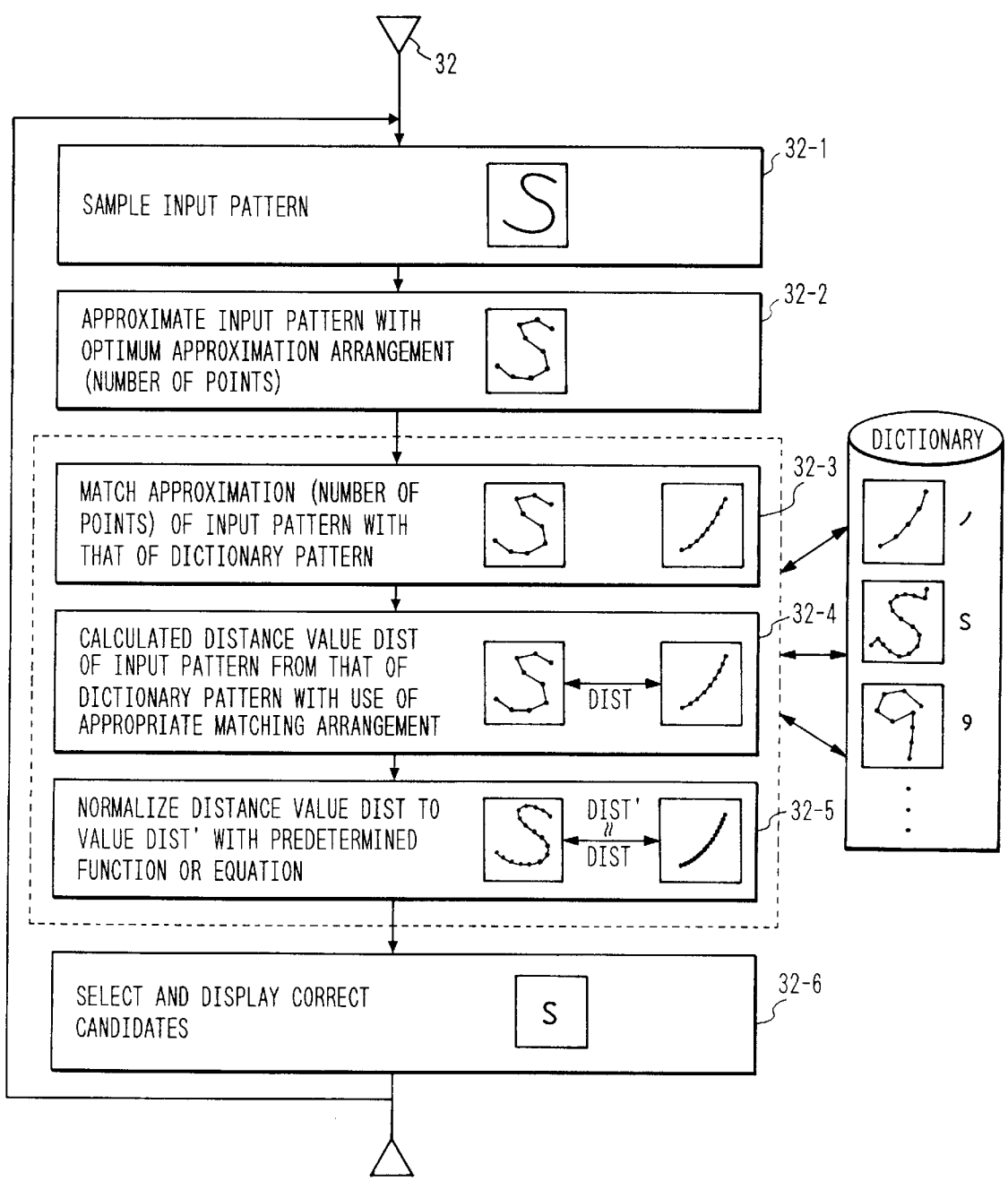
FIG. 23 is a flow diagram illustrating operation steps of the recognition control arrangement.

FIG. 23 depicts a flow diagram illustrating operation steps of the recognition control arrangement 32. First, step 32-1 makes sampling of an entered pattern of one character. Step 32-2 makes the approximation control arrangement 33 approximate the sampled entered pattern with an optimum approximating arrangement (of numbers of approximation points). In turn, step 32-3 matches approximation (of numbers of approximation points) of the approximated entered pattern with the dictionary pattern to obtain a number M of matching points. Step 32-4 makes an appropriate matching arrangement calculate a distance value DIST of the entered pattern and the dictionary pattern. In turn, step 32-5 makes the distance value normalizing arrangement 31 normalize the distance value DIST to value DIST' with use of a predetermined function or equation. Step 32-6 repeats steps 32-3 to -5 for predetermined dictionary patterns to select correct candidates to display.

In turn, the operation steps of the seventh embodiment outlined above are described in detail.

Step 32-1: This step makes sampling of the entered pattern in, for example, the following way. The step should display the LCD a character entering frame. If a user enters a character within the character entering area, the step should draw trace of the pen before storing entered coordinate strings (strokes). The step can detect an end of entering the one character by way of elapsed time, say, 2 seconds after the user interrupted entering the character in the character entering area, moving to another character entering area, or moving outsides of the character entering areas.

Step 32-2: The method of approximating the entered pattern with an optimum approximating arrangement (of numbers of approximation points) will be described later in detail with use of a flow diagram.

Step 32-3: This step makes matching of the entered pattern with the dictionary pattern in the numbers of approximation points in, for example, the following way. The step interpolates approximation points to the approximation points of less number for the ones of more number. Or, it thins down the approximation points of more number for the ones of less number. Or, it reapproximates the approximation points of less number for the ones of more number. Or, it re-approximates the approximation points of more number for the ones of less number. Or, it re-approximates the entered pattern for the number of approximation points of the dictionary pattern. Or, it re-approximates the dictionary pattern for the number of approximation points of the entered pattern. The number of approximation points resulted after matching is called the number M of matching points here.

Step 32-4: This step calculates the distance value DIST of the entered pattern and the dictionary pattern with an appropriate matching arrangement in the following way. The step transfers the entered pattern and the dictionary pattern to the matching arrangement of the number M of matching points. The matching arrangement obtains the distance value (feature difference) of the entered pattern from the dictionary pattern before transferring it to the recognition control arrangement 32. There have been proposed many methods of obtaining the distance value of the entered pattern from the dictionary pattern. As an example, the step obtains city arrangement values of associate approximation points.

Step 32-5: This step normalizes the distance value DIST to value DIST' with use of the predetermined function or equation in, for example, the following way. The step calculates distance values of the same pattern with different approximating and matching arrangements. If difference of the distance values calculated with the approximating and matching arrangements is constant, the step adds the difference to the distance value. This makes it possible to normalize the distance value to the value calculated with the particular approximating and matching arrangements. The example mentioned above will be further described later in detail with use of a process flow diagram.

Another example of method of normalization of the distance values is that ranges of the distance values obtained for a set of patterns with the recognizing arrangements are made identical. A way of the normalization is to make average of the distance values 0 and the dispersion a normal distribution of 1. Let the set of patterns be denoted by (P1, P2, ..., Pi, ..., Pn). Also, let the set of distance values be denoted by (D1, D2, ..., Di, denoted by X. The average X is given (D1+D2+...+Di+...+Dn/n). Still further, let the dispersion be denoted by V. The dispersion V is given by $\{(D1-X)^2+(D2-X)2+,...,+(Di-X)^2+,...,+(Dn-X)^2\}/n$. Still further, let the normalized distance value of the distance value Di be denoted by Di'. Then, normalized distance value Di' is given by $$Di'=(Di-X)/V.$$

Still another example of method of normalization of the distance values is that ranges of the distance values obtained for a set of patterns with the recognizing arrangements are made identical. A way of the normalization is to make distribution of the distance values in range of 0 to 1. Let the set of patterns be denoted by (P1, P2, ..., Pi, ..., Pn). Also, let the set of distance values be denoted by (D1, D2, ..., Di, ..., Dn). Further, let the minimum value of the set of distance values (D1, D2, ..., Di, Dn) be denoted by Dmin. Still further, let the maximum value of the set of distance values (D1, D2, Di, distance value be denoted by Di'. Then, normalized distance value Di' is given by $$Di'=(Di-Dmin)/(Dmax-Dmin).$$

Instead of the above-described examples of method of normalization of the distance values, there may be used any of another methods that the distance values can be compared with each other.

Step 32-6: This step selects and displays the correct candidates in, for example, the following way. The step sorts the candidate characters in the ascending order of the distance values before selecting ten correct candidates in the ascending order of the distance values to display.

FIG. 24 depicts a flow diagram illustrating operation steps of the approximation control arrangement 33. First, step 33-1 initializes number N of approximation points. In turn, step 33-2 increases the number N of approximation points. Step 33-3 approximates the entered pattern with the N-point approximating arrangement. If step 33-4 judges whether or not approximation accuracy of the approximated pattern is optimum. If so, step 33-5 feeds out the approximated pattern. If step 33-6 has no optimum approximation accuracy of the approximated pattern, control returns to step 33-2.

Step 33-1: The initialization of the number N of approximation points is made with use of, for example, Eq. 1 below.

$$N=2P+1(p=1) \quad (1)$$

Step 33-2: The increase of the number N of approximation points can be made by way of, for example, making p in Eq. 1 above p=p+1.

Step 33-3: The approximation of the entered pattern with the Npoint approximating arrangement is made in, for example, the following way. The step transfers the entered pattern sent from the recognition control arrangement 32 to the N-point approximating arrangement. In turn, the N-point approximating arrangement makes, for example, equal-division approximation of the entered pattern before transferring the approximation result to the approximation control arrangement 33. For the approximation, a different method can be used instead of the equal-division approximation.

Step 33-4: The judgment of whether or not the approximation accuracy is optimum is made in, for example, the following way. Let L denote whole length of the stroke of the entered pattern. Also, let L' denote whole length of a pattern approximate to it. The judgment can be made by checking whether the number of approximation points is the least one that meets the equation below.

one stroke is equally divided by a least number N of points that meets Eq. 2 below.

$$L' \geq aL+b(a \text{ and } b=\text{constants})$$

Step 33-5: If step 33-4 judges that the approximation accuracy is optimum, the approximated pattern is transferred to the recognition control arrangement 32.

As described above, the operation steps of the approximation control arrangement 33 can obtain the pattern approximated with the optimum approximating arrangement.

In turn, the following describes an example of the distance value normalization.

Figure 25:
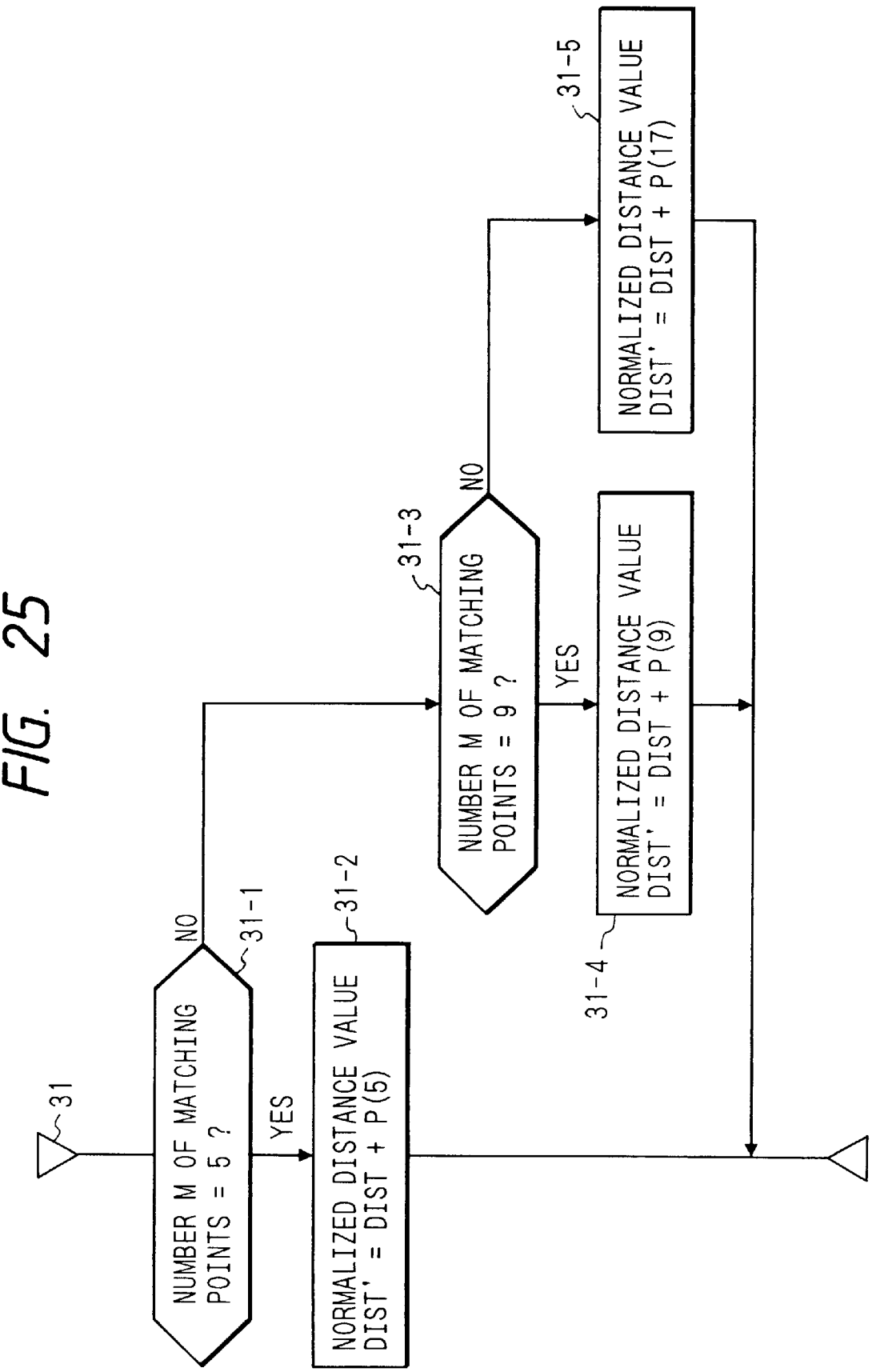
FIG. 25 is a flow diagram illustrating process steps of the distance value normalizing arrangement.

FIG. 25 depicts a flow diagram illustrating process steps of the distance value normalizing arrangement 31. The process flow is outlined below. If step 31-1 has 5 of the number M of matching points, the distance value is a 5-point matching normalization value P(5).

Step 31-2 adds P(5) to the distance value DIST to obtain a normalized distance value DIST'. Similarly, if step 31-3 has 9 of the number M of matching points, the distance value is a 9 point matching normalization value P(9).

Step 31-4 adds P(9) to the distance value DIST to obtain a normalized distance value DIST'. In the other case, that is, if the number M of matching points is 17, the distance value is a 17-point matching normalization value P(17).

Step 31-5 adds P(17) to the distance value DIST to obtain a normalized distance value DIST'.

The embodiment (the method similar to the one in FIG. 22) can have the matching normalization value used at steps 31-2, -4, and -5 set with use of FIG. 22 as

P(5)=20,

P(9)=10, and

P(17)=0.

The above-described process of distance value normalization can obtain the value virtually equal to the one calculated with the 17-point matching arrangement even with matching made with any of the matching arrangements.

The above-described seventh embodiment can obtain the distance value efficiently and accurately with use of the optimum approximating arrangement and matching arrangement different for the patterns. The seventh embodiment also can compare the distance values to decide the correct candidate as a particular approximating arrangement and matching arrangement obtain the ones in the way of normalizing the distance values.

In turn, the following describes an eighth embodiment of the present invention.

Figure 26:
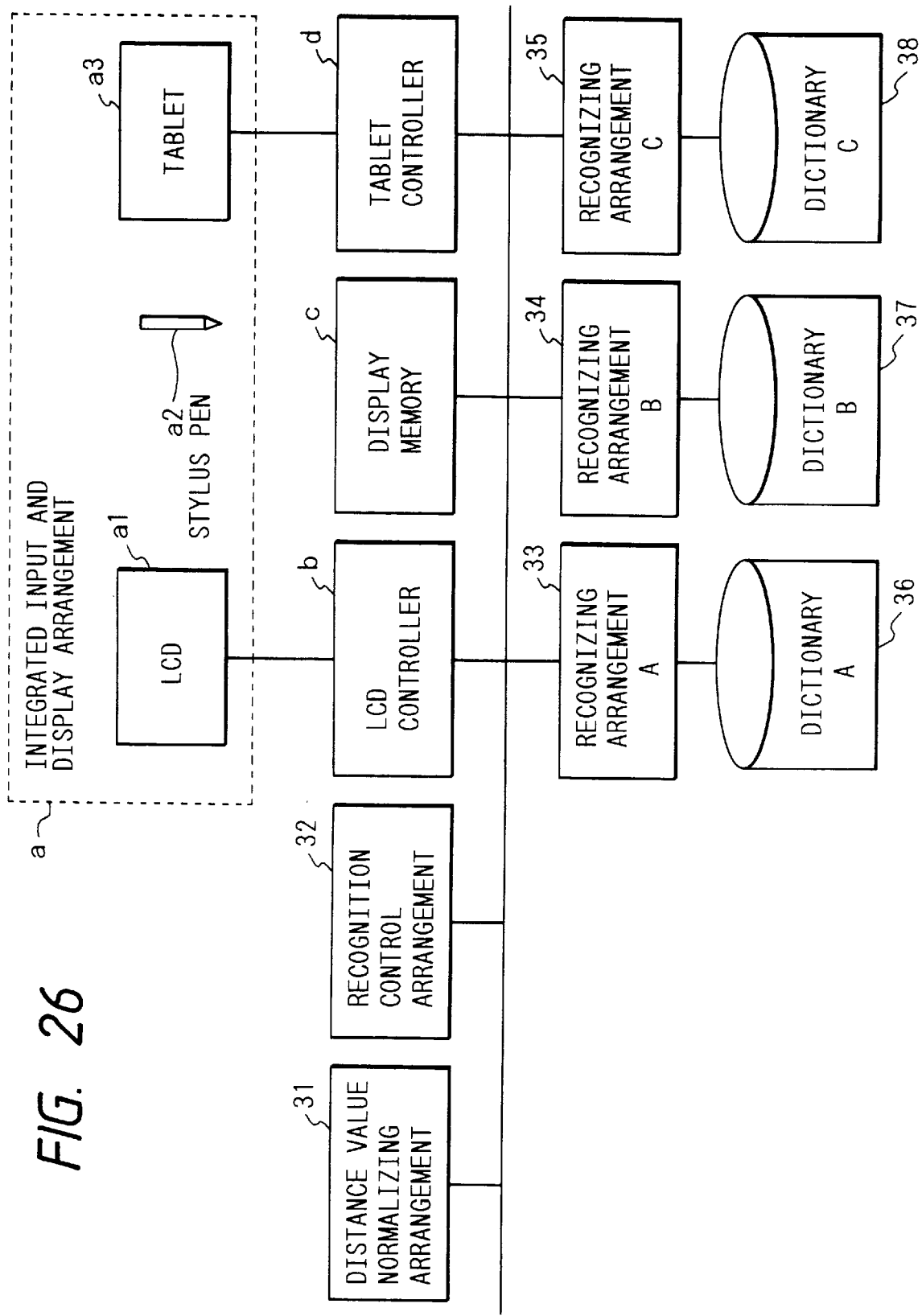
FIG. 26 is a block diagram illustrating functions of the pattern recognition system having a plurality of pattern recognizing arrangements of the present invention.

FIG. 26 depicts a block diagram illustrating functions of the pattern recognition system having a plurality of pattern recognizing arrangements, such as a character recognizing arrangement, a symbol recognizing arrangement, and a figure recognizing arrangement, and a distance value normalizing arrangement. Operation of the eighth embodiment is outlined below. If the user slides a stylus pen a2 on a tablet a3, strokes (coordinate string data) are entered in the pattern recognition system. The stroke is fed through a tablet controller d to a recognition control arrangement 32. The recognition control arrangement 32 transfers the strokes of one character to the recognizing arrangements A 33 to C 35. Each of the recognizing arrangements A 33 to C 35 makes pattern matching of the entered data with use of their respective dictionaries A 36 to C 38. The distance value normalizing arrangement 31 normalizes the calculated distance values before feeding the normalized distance values to a recognition control arrangement 32. The recognition control arrangement 32 selects low normalized distance values as correct candidates before displaying them. The distance value normalizing arrangement 31 should be configured same as that of the preceding seventh embodiment.

The eighth embodiment configured as in FIG. 26 can make recognition of the strokes having characters, symbols, and figures mixed therein with matching methods adequate to the respective strokes without distinguishing the strokes at the stage of entering them.

As described above, the eighth embodiment decides the correct candidates only by means of the distance values obtained with the plurality of recognizing arrangements. Alternatively, the eighth embodiment may be made to decide the correct candidates by means of not only the distance values, but also peculiarities of the entered pattern, such as position, size, color, writing pressure, entering speed, and recognition mode.

Further alternatively, the eighth embodiment may be made to decide the correct candidates by means of the recognition results and not only the distance values, but also peculiarities of the entered pattern, such as position, size, color, writing pressure, entering speed, and recognition mode.

Each of the recognizing arrangements may be made to have only, for example, the approximating arrangements made different. Each recognizing arrangement may be made to have a single matching arrangement and a single dictionary. Each recognizing arrangement may be made to have a single approximating arrangement and a plurality of matching arrangements alone.

If there are provided pluralities of dictionaries and matching arrangements, it may be made to select a dictionary and matching arrangement for use in recognition depending on the approximating arrangement.

Alternatively, it may be made to select a dictionary, an approximating arrangement, and matching arrangement for use in recognition depending on peculiarities of the entered pattern, such as position, size, color, writing pressure, entering speed, and recognition mode.

The following describes a ninth embodiment that is an example of on-line character recognition system of the present invention in which an entered pattern can be recognized even if the entered pattern is elongated or contracted, by reference to FIGS. 27 to 36.

Figure 27:
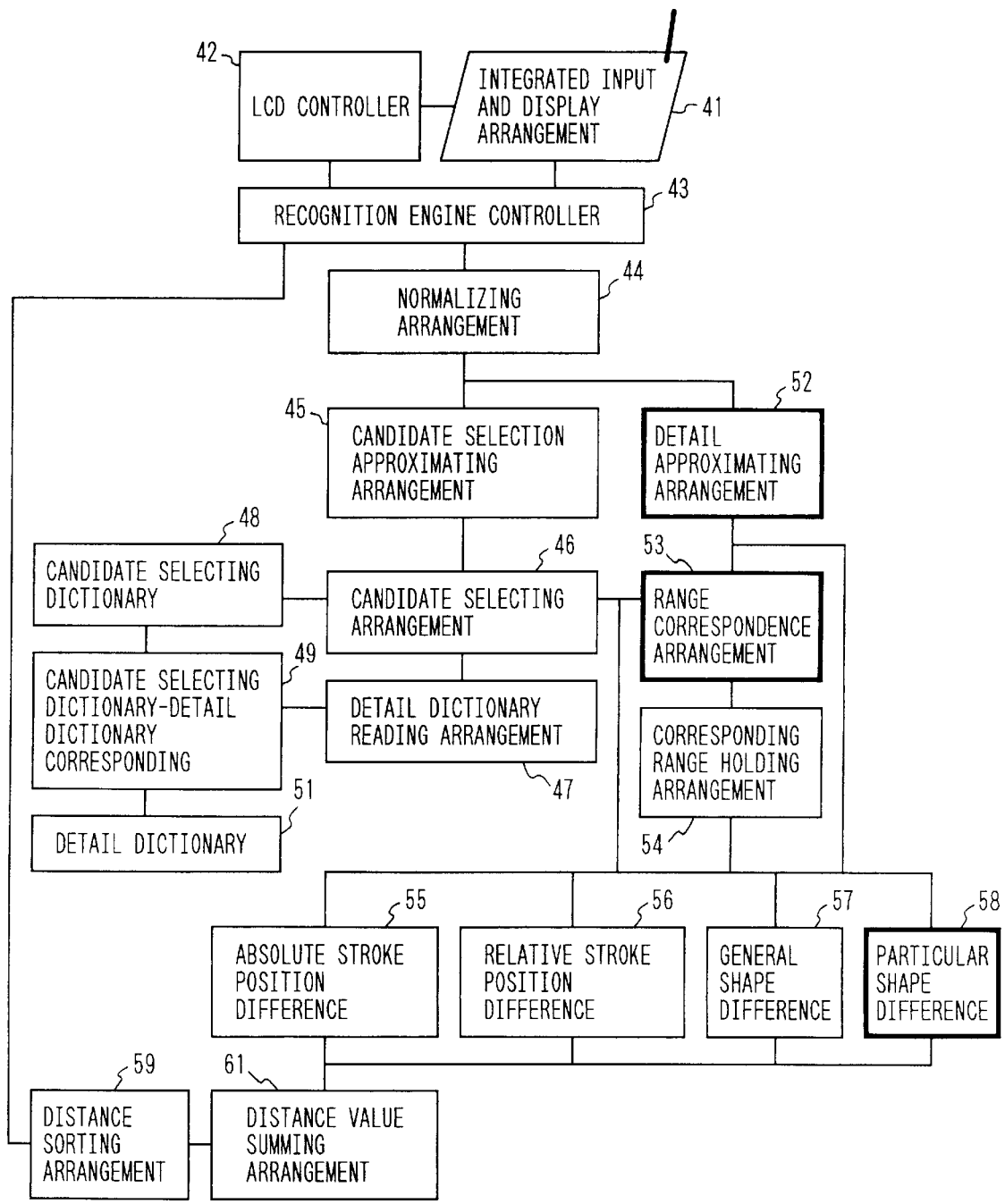
FIG. 27 is a block diagram illustrating a configuration of a online character recognition system of the present invention.

FIG. 27 depicts a block diagram illustrating a configuration of the on-line character recognition system.

A user should write character patterns by hand with a pen to enter. An integrated input and display arrangement 41 senses coordinates of the pen at every unit time. A recognition engine controller 43 feeds to a normalizing arrangement 44 the coordinates of one character of the pen to be recognized at every unit time. A normalizing arrangement 44 normalizing the coordinates and size of the one character pattern.

A candidate selection approximating arrangement 45 approximates the normalized character pattern roughly, for example, a stroke with six points. That is, such an approximating method of the patterns may miss some features of the shape of the entered original pattern, such as loops, joints, curves, and straight lines, as written continuously. However, the selection method should select such candidates that include correct characters in a high order. A candidate selecting dictionary 48 has patterns for selecting the roughly approximated candidate stored therein in the same approximating method as the candidate selection approximating arrangement 45. A candidate selecting arrangement 46 selects from among the candidate selecting dictionary 48 candidate characters of the entered character patterns approximated for selecting the candidates. For the selecting method of approximating one stroke with the six points, as an example, it should be made to find a difference of (1) a beginning and end coordinates of each stroke from (2) a transition vector between the approximated points before selecting ten candidates of summations of the differences in ascending order. The candidate selection approximating arrangement 45, the candidate selecting dictionary 48, and the candidate selecting arrangement 46 may be replaced by any other functional devices that can select correct characters in the high order with small numbers of feature points and arithmetic operations.

A detail approximating arrangement 52 approximates the normalized character pattern in some degree of detail that the features of the shape of the entered original pattern, such as the loops, the joints, the curves, and the straight lines, can be remained or presumed. As an example, the detail approximating arrangement 52 approximate the pattern in a way that one stroke is equally divided with a least number N of points that meets Eq. 2 below.

$$L' \geq aL+b \quad (2)$$

where L' denotes a length of the stroke after approximation and L is a length of the stroke before approximation.

The detail approximating arrangement 52 may be replaced by any other functional device that can approximate the normalized character pattern in some degree of detail that the features of the shape of the entered original pattern, such as the loops, the joints, the curves, and the straight lines, can be remained or presumed. The stroke may be equally divided with a large number N of points for approximation at narrow intervals of points.

A candidate selecting dictionary-detail dictionary 49 has data to tell which patterns of the candidate selecting dictionary 48 are same as those of a detail dictionary 51. The detail dictionary 51 has the original patterns that generated the approximated patterns of the candidate selecting dictionary 48, the original patterns being approximated in the approximated method of the detail approximating arrangement 52. A detail dictionary reading arrangement 47 reads detailed dictionary patterns of the candidates selected by the candidate selecting arrangement 46.

The above-described candidate selection approximating arrangement 45, the candidate selecting arrangement 46, the detail dictionary reading arrangement 47, the candidate selecting dictionary 48, and the candidate selecting dictionary-detail dictionary 49 are provided for reducing the candidates through the processes of light loads thereof in advance to make the recognition process at high rate. They may be omitted for no problem of the process time.

A range correspondence arrangement 53 makes the entered pattern approximated in detail correspond to the dictionary pattern in each approximation broken line. For example, the range correspondence arrangement 53 makes DP matching in the transition vectors of the entered pattern and the dictionary pattern. In addition to the transition vector, features for the correspondence include coordinates of approximation points, directional codes of the transition vector, difference of the directional codes (angle change), results of Fourier transform, and image data. Instead of the DP matching, there may be used a method that checks all the correspondences before searching a correspondence having the least sum of distance values. This method, however, increases amount of processes. A corresponding range holding arrangement 54 holds the correspondences of the entered pattern approximated in detail to the dictionary pattern in each approximation broken line.

An absolute stroke position difference 55 compares a position of each stroke of the entered pattern with that of the dictionary pattern to find a difference of them. An available stroke position is coordinates of a beginning, an end, a mid-point, or a center of gravity of the stroke. A relative stroke position difference 56 compares the entered pattern with the dictionary pattern as to relative positional relationships of the strokes of the patterns, such as contact of ends together, contact of one end with a position other than the other end, crossing of the strokes, and others, to find differences. A general shape difference 57 finds a difference of each broken line of the entered pattern approximated with broken line from that of the dictionary pattern. An available difference, for examples, is one or combination of a plurality of the features, including the transition vector, the coordinates of approximation points, the directional codes of the transition vector, the difference of the directional codes (angle change), and the results of Fourier transform. If the general shape difference 57 uses results of the corresponding range holding arrangement 54, the recognition rate can be increased.

A particular shape difference 58 is a heart of the present invention. The particular shape difference 58 finds differences of particular features, such as the loops, the joints, the curves, and the straight lines, of a plurality of broken lines, while the general shape difference 57 finds the difference of each broken line of the entered pattern approximated with broken line from that of the dictionary pattern. That is, the particular shape difference 58 evaluates whether or not the particular features of the dictionary pattern exist at positions of the entered pattern corresponding thereto before calculating differences of the particular features.

A distance value summing arrangement 61 gives weights to the above-mentioned differences before summing the weighted differences. A distance sorting arrangement 59 sorts the candidate characters with the distance values. The results of the sort are received by the recognition engine controller 43. The recognition engine controller 43 then directs a LCD controller 42 so that the integrated input and display arrangement 41 should display the first and second and following candidates thereon.

Figure 28:
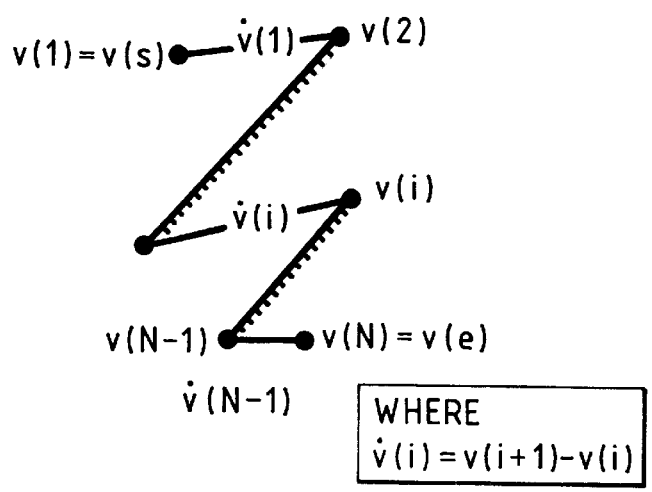
FIG. 28 is a figure illustrating an example of the pattern approximated by the candidate selection approximating arrangement.

FIG. 28 depicts a figure illustrating an example of the pattern approximated by the candidate selection approximating arrangement 45 and the detail approximating arrangement 52 in the approximation method of N-point strokes. The candidate selection approximating arrangement 45 approximates each stroke of the entered original pattern with six points of dividing a length by 5 (N=5). Then the candidate selecting arrangement 46 finds a difference of the strokes with use of Eqs. 3 and 4 below.

[1] Beginning and end point coordinates:

$$v(1)=v(s) \qquad (3)$$

[2] Transition vectors among approximated points:

$$v\hat{}(1), \ldots, v\hat{}(i), \ldots, v\hat{}(N-1) \qquad (4)$$

Similarly, the detail approximating arrangement 52 also makes approximation with N points. The number of N points, however, has to be large enough to make approximation in some degree of detail that the features of the shape of the entered original pattern, such as the loops, the joints, the curves, and the straight lines, can be remained or presumed.

The absolute stroke position difference 55 in the ninth embodiment compares positions of the strokes of the entered pattern and the dictionary pattern with use of Eq. 3 to find differences of them. The general shape difference 57 finds differences of the broken lines of the entered pattern approximated with broken line and the dictionary pattern with use of Eq. 4.

Figure 29A:
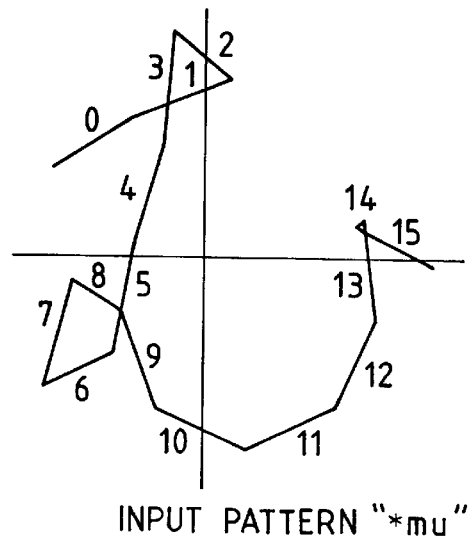
FIG. 29A is a pattern illustrating an example of character pattern approximated by the detail approximating arrangement.
Figure 29B:
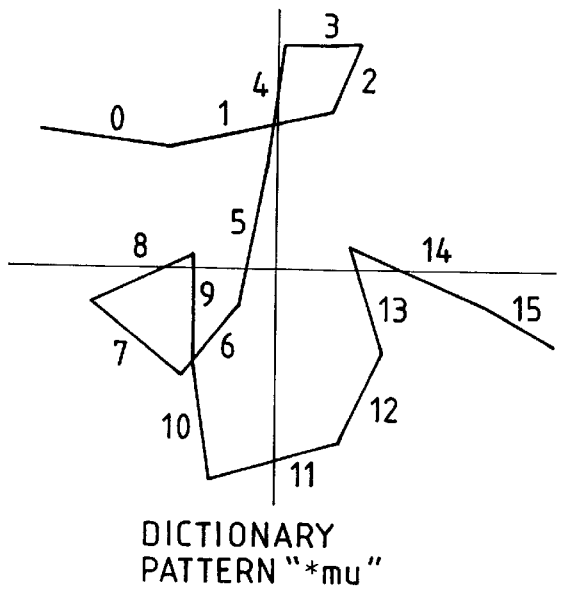
FIG. 29B is a pattern illustrating another example of character pattern approximated by the detail approximating arrangement.
Figure 29C:
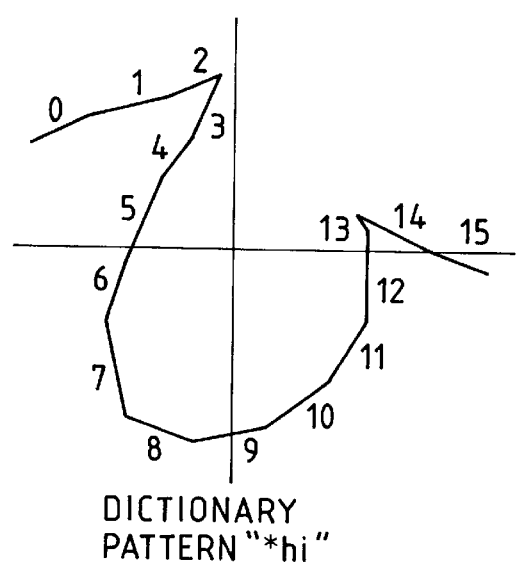
FIG. 29C is a pattern illustrating still another example of character pattern approximated by the detail approximating arrangement.

FIGS. 29A to 29C depict patterns illustrating examples of the character patterns approximated by the detail approximating arrangement 52. Each example has 17 approximation points used to divide the character by 16 (N=17) equally. The example has the features of the shape of the entered original pattern, such as the loops, the joints, the curves, and the straight lines, remained therein.

Figure 30:
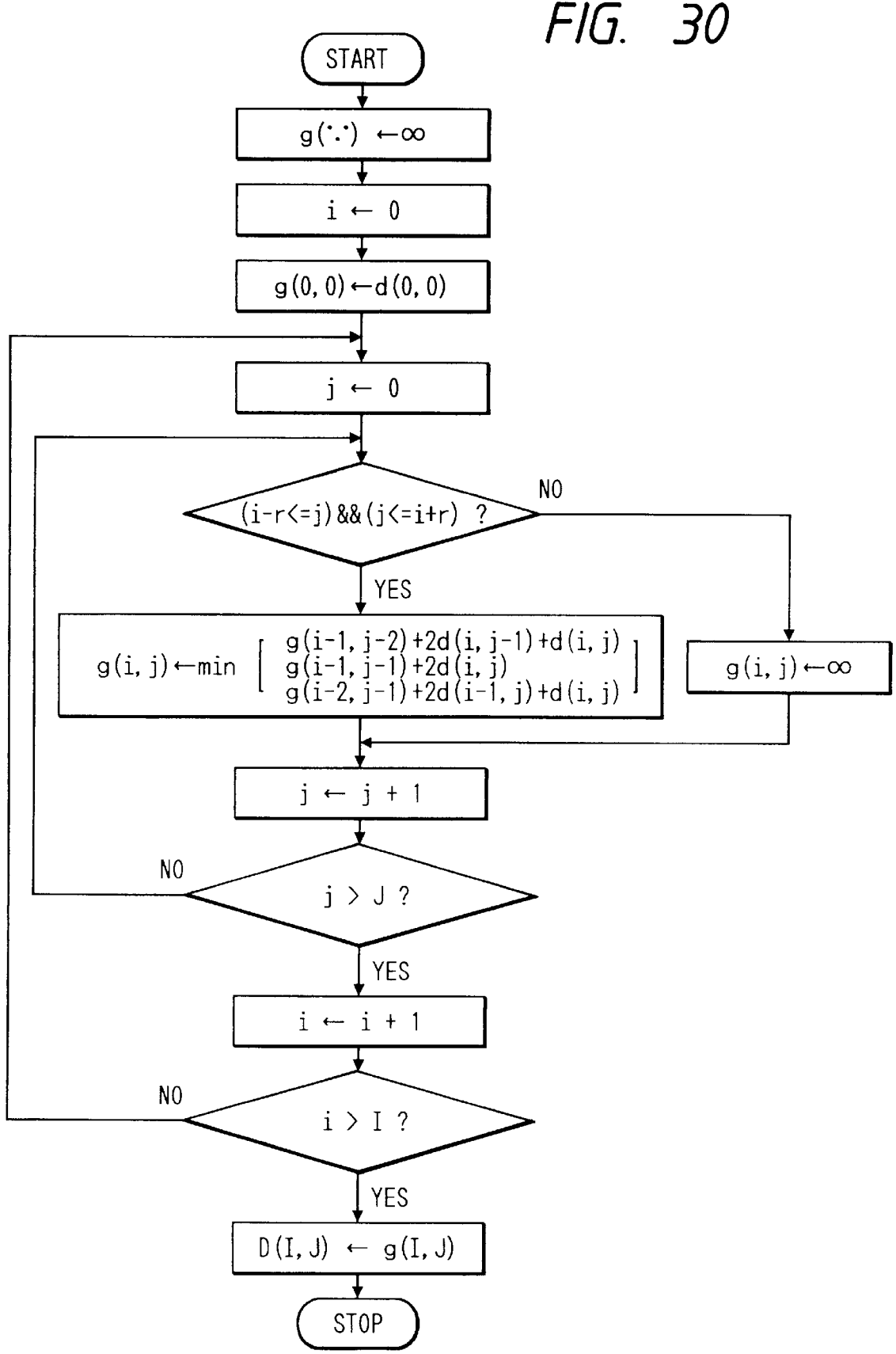
FIG. 30 is a flow diagram illustrating an example of the DP matching for accomplishment of the range correspondence arrangement.

FIG. 30 depicts a flow diagram illustrating an example of the DP matching for accomplishment of the range correspondence arrangement 53. The DP matching, like the general DP matching, makes (i, j) correspondences of feature vector strings v(i) and U(j) where i and j are 0 to I and 0 to J, respectively. The DP matching then sums differences d(i, j) of the correspondences to obtain arrays g(i, j) successively. For example, d(3, 3) is a variable for obtaining the least distance value in a range of i=0 to 3 and j=0 to 3.

Here is defined the difference d (i, j) of each correspondence with use of the transition vectors described FIGS. 28 and 29A to 29C as the feature vector strings by Eq. 5 below.

$$d(i,j)=|v\hat{}(i)-U\hat{}(j)| \qquad (5)$$

where v^(i) denotes the transition vector string of the entered pattern and U^(j) is the transition vector string of the dictionary pattern.

Now, the process steps of FIG. 30 is described below. The two-dimension array g(*, *) is for the distance value of a result in the course of the DP matching. The array g(*, *) is initialized with ∞. Since the both beginning points of the patterns, or v(0) and U^(0), correspond always to each other, g(0, 0) has d(0, 0) substituted for it.

Then, d(0, 0) and g(0, 0) are obtained successively with the respective loops of i and j being 0 to I and 0 to J.

If all the j's correspond to i, a large number of arithmetic operations must be made, particularly for extraordinary correspondences. To make the process at high rate, it is preferable to determine a range of j's for i in advance as given by Eq. 6 below.

$$i-r \leq j \leq i+r, \ j \geq 0 \qquad (6)$$

Further, correspondences g(i, j) out of Eq. 6 have ∞ substituted for it.

The correspondences g(i, j) meeting Eq. 6 have the least one of the following three correspondences D to F selected to substitute for it.

D: Least of g(i−1, j−2)+2d(i, j−1)+d(i, j), that is, correspondence of (i−1, j−2) to (i, j−1) to (i, j).

E: Least of g(i−1, j−1)+2d(i, j), that is, correspondence of (i−1 , j−1 ) to (i, j).

F: Least of g(i−2, j−1 )+2d(i−1, j)+d(i, j), that is, correspondence of (i−2, j−1) to (i−1, j) to (i, j).

The process is repeated by loop. Out of the loop, sum of the distance values obtained with g(I, J) is the distance value by the optimum correspondence of the entered pattern transition vector string v^(i) to the dictionary pattern transition vector string U^(j) where i and j are 0 to I and 0 to J, respectively. The correspondence of distance value is saved to obtain the optimum correspondence.

Figure 31:
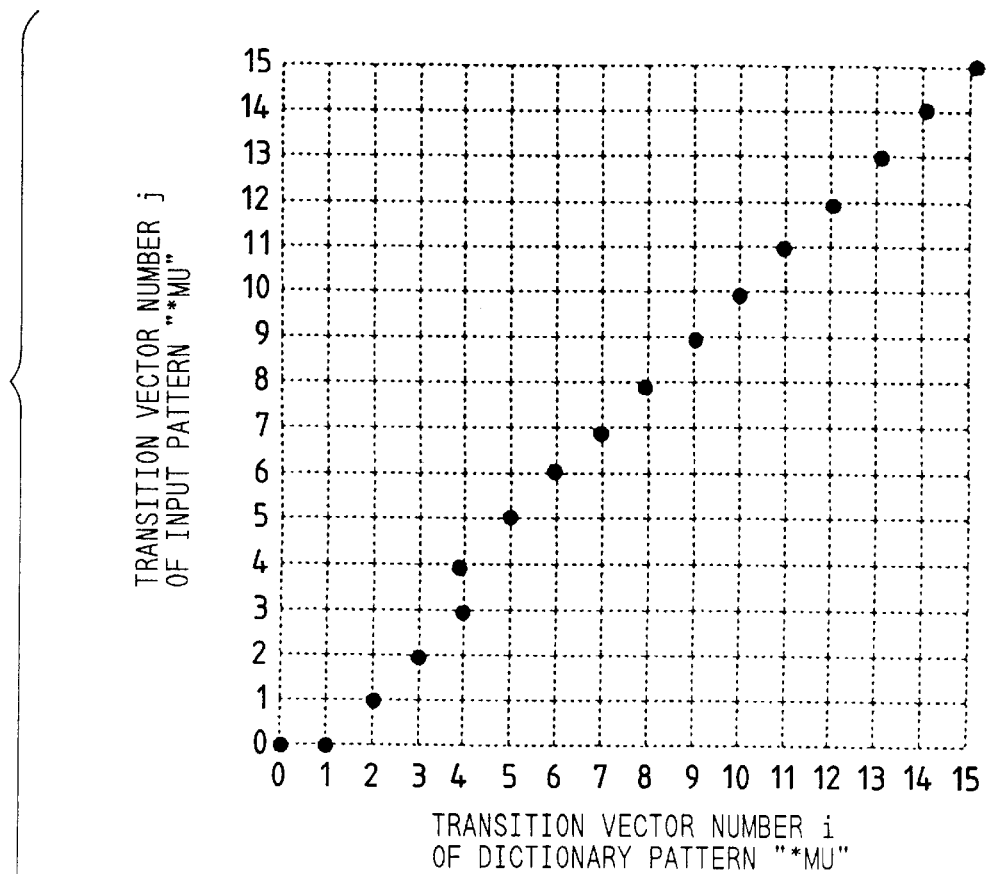
FIG. 31 is a graph illustrating the optimum correspondences as results of the DP matching of the entered and dictionary character patterns.

FIG. 31 depicts a graph illustrating the optimum correspondences as results of the DP matching of the entered and dictionary character patterns A and B "*mu" shown in FIG. 29A and 29B. Since beginning lateral stroke of "*mu" in FIG. 29A is shorter than that of FIG. 29B, the first transition vector v^(0) is made to correspond to the transition vectors u^(0) and u^(1) of the dictionary character pattern B "*mu" in FIG. 29B.

Figure 32:
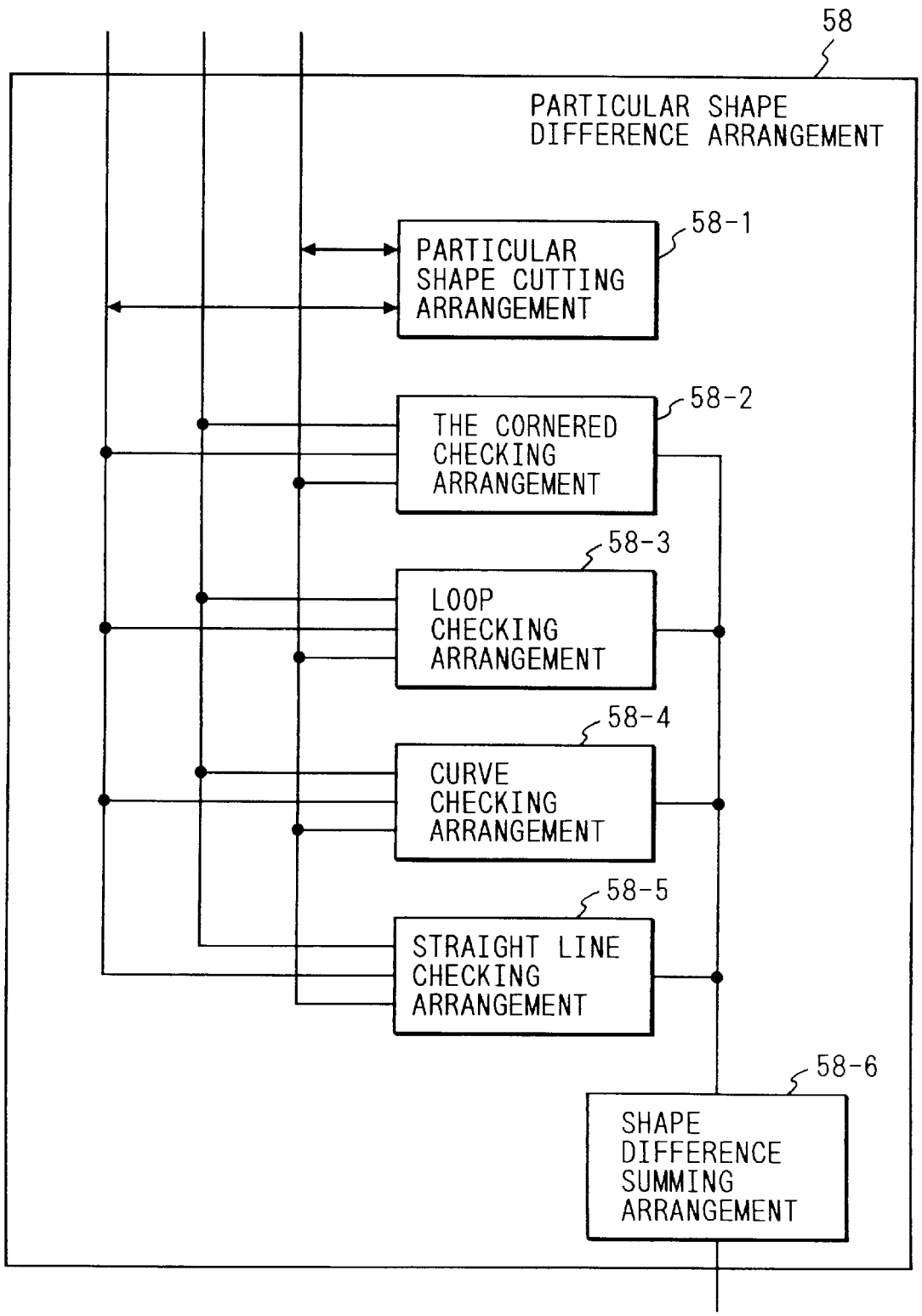
FIG. 32 is a block diagram illustrating the particular shape difference shown in FIG. 27.

FIG. 32 depicts a block diagram illustrating a detailed configuration of the particular shape difference 58 shown in FIG. 27. A particular shape difference 58-1 cuts out the features of the entered and dictionary patterns approximated in detail, such as the loops, the joints, the curves, and the straight lines. Each of a joint, loop, curve, and straight line checking arrangements has optimum correspondences of the respective features made to the entered pattern transition vector string v^(i) to the dictionary pattern transition vector string U^(j) where i and j are 0 to I and 0 to J. Each of the joint, loop, curve, and straight line checking arrangements, then, checks the respective features of joint, loop, curve, and straight line before finding differences from the ones of the dictionary pattern.

A particular shape difference 58-6 sums the differences of the features of the entered and dictionary patterns obtained by the checking arrangements. Instead, the particular shape difference 58-6 may be made to find an average, a least value, or a weighted sum of the differences.

Figure 33:
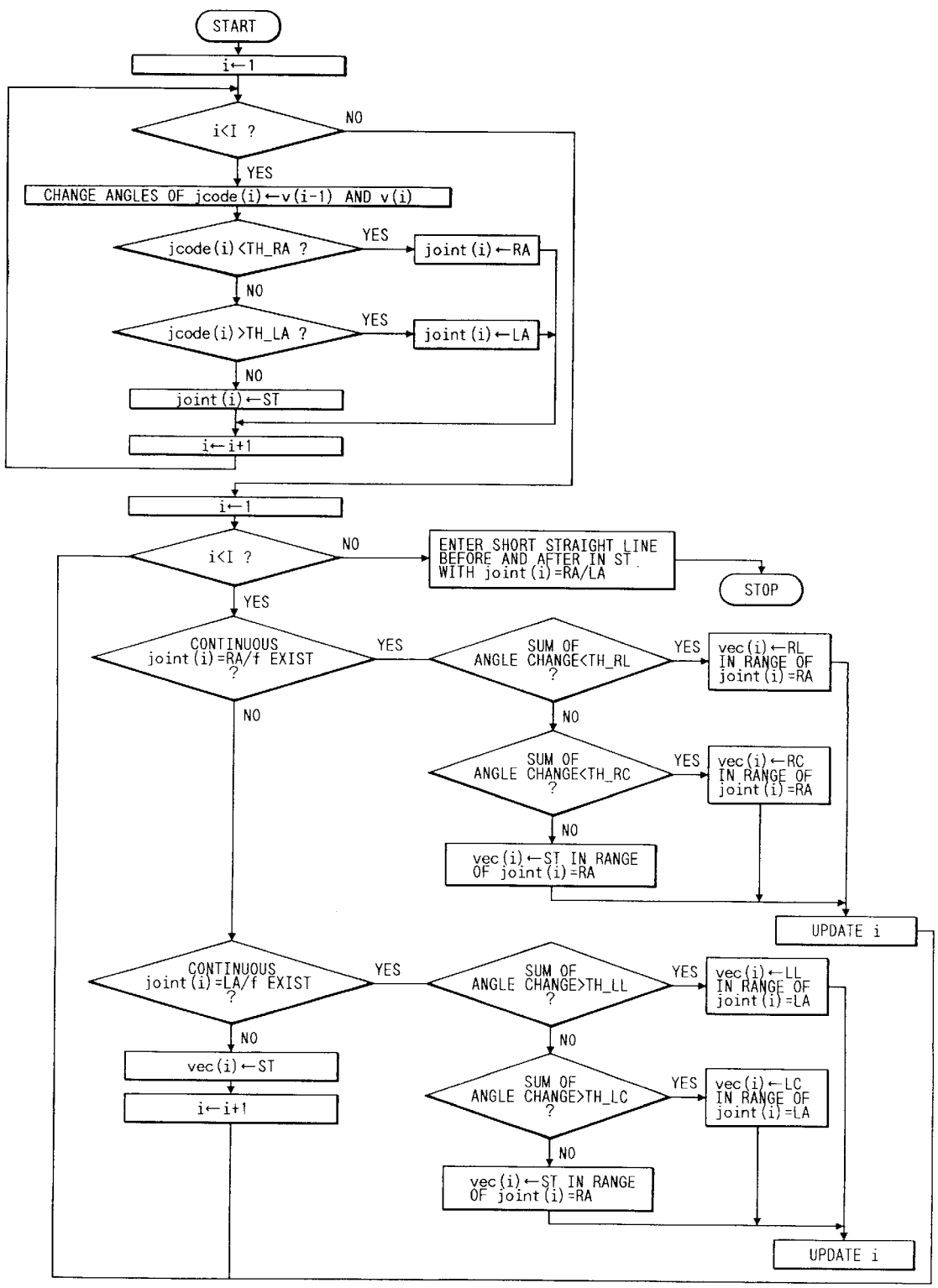
FIG. 33 is a flow diagram illustrating an example of process of the particular shape difference.

FIG. 33 depicts a flow diagram illustrating an example of process of the particular shape difference 58-1. The ninth embodiment givloops, attributes of loops, joints, curves, and straight lines to the transition vectors by way of taking notice in changes of the angles of the pattern transition vector string.

First, a loop i (i=1 to I) obtains the angle change of v^(i−1) and v^(i) in jcode(i). If the angle change is lower than a predetermined threshold value TH_RA, the loop i enters RA in joint(i) as a negative angle. If the angle change is higher than a predetermined threshold value TH_LA, on the other hand, the loop i enters LA in joint(i) as a positive angle. If the angle change is higher than TH_RA and lower than TH_LA, the loop i enters ST in joint(i) as a straight line.

In turn, the loop i (i=1 to I) judges jcode(i). If continuous RA exists, the loop i sums the angle changes. If the sum is lower than the predetermined threshold value TH_RA, the loop i enters RL in vec(i) as a negative loop. If the sum is higher than TH_RL and lower than TH_RC, the loop i enters RC in vec(i) as a negative curve. For a positive angle change, similarly, the loop i ethers LC or LL in vec(i) with use of a threshold value TH_LC or TH_LL accordingly.

Finally, to prevent the loop i from checking a joint due to hand blur as a particular feature, the loop i searches for an individual joint having no loop and curve formed. That is, the loop i searches for a joint of vec(i−1), vec(i)=RL/RC/LC/LL, and joint(i)=RA or LA.

Further, if whole length of ST of vec(i−1) and vec(i) continued before and after the joint is short, the loop i judges that join(i) is a joint due to the hand blur before entering ST in joint(i).

FIG. 34 depicts a list illustrating results of the process of the particular shape difference 58-1 for the entered character pattern A "*mu" in FIG. 29A. The list shows that the loop by v^(5) to v^(8) different from the dictionary character pattern "*hi" C in FIG. 29C can be successfully cut out.

Figure 35:
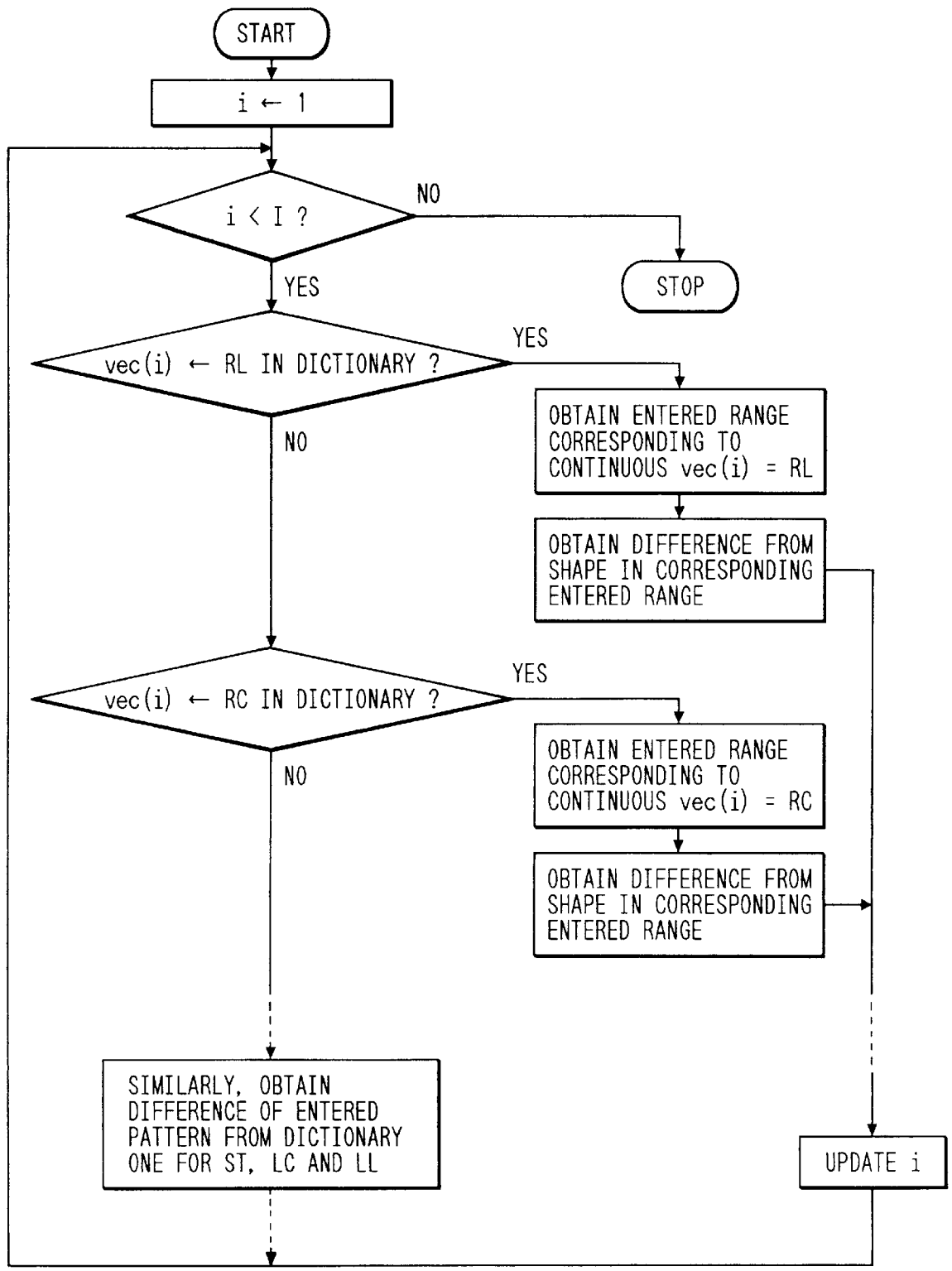
FIG. 35 is a flow diagram illustrating an example of process of the shape checking arrangements sown in FIG. 27; and, FIG. 36 is a table illustrating the differences of the entered patterns from the dictionary ones.

FIG. 35 depicts a flow diagram illustrating an example of process of the particular shape difference 58-2, the particular shape difference 58-3, the particular shape difference 58-4, and the particular shape difference 58-5. If a loop i (i=1 to I) finds features of the shape in vec(i) of the transition vector string of the dictionary pattern, it finds differences of the dictionary and entered patterns on the basis of vec' (i) of the entered pattern corresponding to the range of the dictionary. If the attributes of the shapes of the patterns coincide with each other, the differences are 0. If the shape of the entered pattern is turbulent or distorted as when quickly handwritten, the following differences are obtained.

FIG. 36 depicts a table illustrating the differences of the entered patterns from the dictionary ones when the shape of the entered pattern. As can be seen from the table, the difference is made small for likely deformed patterns, and it is made large for hardly deformed patterns. If the dictionary pattern being a negative loop, if the entered pattern is a negative loop, the difference is 0, If it is a positive or negative curve, the difference is 10. In the other cases, the difference is 20. To absorb such deformations in further detail, if the dictionary pattern is negative loop and the entered pattern is a negative curve, changes of angles are summed. The difference is made 0 to 20 depending on the summed value.

Alternatively, the differences may be replaced by degree of the deformation to represent similarities in range of 0 to 1. This method is to obtain least values and averages of similarities of the features of patterns finally.

In the examples shown in FIGS. 29A to 29C, differences of the shapes are calculated as follows.

Entered pattern A and dictionary pattern B in range i of 13 to 15: The dictionary pattern is a positive joint and the entered pattern is a negative curve. The shape difference is 10.

Entered pattern A and dictionary pattern C in range i of 1 to 3: The dictionary pattern is a positive joint and the entered pattern is a negative curve. The shape difference is 10.

Entered pattern A and dictionary pattern C in range i of 5 to 9: The dictionary pattern is a negative curve and the entered pattern is a positive loop. The shape difference is 20.

Entered pattern A and dictionary pattern C in range i of 13 to 15: The dictionary pattern is a positive joint and the entered pattern is a negative curve. The shape difference is 10. The sum of the shape differences is 40.

Thus, the pattern A "*mu" can be recognized, while it is recognized wrongly only by the results other than the particular shape difference 58.

What is claimed is:

1. An information processing system having a plurality of information processors connected via a signal line, each information processor comprising:

an input section for entering a character pattern, a display unit for displaying a character corresponding to said character pattern;

a dictionary for storing a plurality of character patterns and a plurality of codes associated therewith in advance;

a memory section for storing a priority level of dictionaries in said plurality of information processors connected via said signal line; and a dictionary reference section, adapted to read a one of said plurality of codes associated with said character pattern from its own dictionary, or from at least one other dictionary in another information processor, via said signal line, on the basis of said priority level stored in said memory section, for outputting said one of said plurality of codes, read as a result of recognition of said character pattern, to said display unit.

2. An information processing system having a plurality of information processors connected via a signal line, each of said plurality of information processors comprising:

an input section for entering a hand-written character pattern;

a display unit for displaying an appropriate character associated with said hand-written character pattern;

a dictionary for storing a plurality of hand-written character patterns and a plurality of codes associated with said plurality of hand-written character patterns in advance;

a memory section for storing a priority level of the dictionaries in said plurality of information processors connected to said signal line; and a dictionary reference section, adapted to read out candidate codes corresponding to said character pattern having been entered from its own dictionary, or from at least one other dictionary in another of said plurality of other information processor, for rearranging said candidate codes having been read as a result of recognition of said character pattern on the basis of said priority level, and outputting said codes in a rearranged sequence to said display unit.

3. An information processing system having a plurality of information processors connected via a signal line, each of said plurality of information processors comprising:

an input section for entering characters;

a display unit for displaying characters corresponding to said characters having been entered and different kinds of characters corresponding thereto;

a dictionary for storing a plurality of characters; a plurality of character codes associated therewith and a plurality of different kinds of character codes thereof;

a memory section for storing a priority level of dictionaries in said plurality of information processors connected to said signal line; and a dictionary reference section adapted to read out a different kind of character code associated with said character from its own dictionary or from at least one other dictionary in another information processor on the basis of said priority level stored in said memory section, for outputting said different kind of character codes, upon coincidence with said character having been read, to said display unit.

4. An information processing system having a plurality of information processors connected via a signal line, each of said plurality of information processors comprising:

an input section for entering a character;

a display unit for displaying said character having been entered and at least one different kind of character associated with said character;

a dictionary which stores a plurality of characters, a plurality of character codes associated with said plurality of characters, and a plurality of different kinds of character associated with each of said plurality of characters;

a memory section for storing a priority level of the dictionaries in said plurality of information processors connected via said signal line; and a dictionary reference section provided in each of said plurality of information processors which reads out said different kinds of character codes associated with said character having been entered from its own dictionary or from at least one other dictionary provided in another information processor for rearranging said different kinds of character codes having been read out on the basis of said priority level and outputting said different kinds of character codes in a rearranged sequence to said display unit.

5. An information processing system having a plurality of information processors and a dictionary memory unit for storing character codes associated with character patterns connected via a signal line, wherein each of said plurality of information processors comprises:

an input section for inputting a character pattern;

a display unit for displaying a character associated with said character pattern having been input;

a dictionary for storing in advance a plurality of character patterns and a plurality of character codes associated with said plurality of character patterns; and a dictionary reference unit which reads out a character code associated with said character pattern having been input from its own dictionary, from at least one other dictionary in another information processor and/or from said dictionary memory unit connected to said signal line, for outputting said character code, read as a result of recognition of said character pattern, to said display unit, wherein each of said plurality of information processors include a memory section for storing a priority level of each of the dictionaries provided in said plurality of information processors and of said dictionary memory unit connected to said signal line, and wherein said dictionary reference units read out said character code associated with said character pattern on the basis of said priority level.

6. An information processing system having a plurality of information processors and a dictionary memory unit for storing character codes associated with character patterns connected via a signal line, wherein each of said plurality of information processors comprises:

an input section for inputting a character pattern;

a display unit for displaying a character associated with said character pattern having been input;

a dictionary for storing in advance a plurality of character patterns and a plurality of character codes associated with said plurality of character patterns; and a dictionary reference unit which reads out a character code associated with said character pattern having been input from its own dictionary, from at least one other dictionary in another information processor and/or from said dictionary memory unit connected to said signal line, for outputting said character code, read as a result of recognition of said character pattern, to said display unit, wherein each of said plurality of information processors further includes a dictionary learning section which enables storing a character pattern having been input and a character code which has been read out from another dictionary in its own dictionary.

7. An information processing system according to claim 6, further comprising a dictionary optimization unit which allows said dictionary memory unit connected to said signal line to store a character pattern and its associated character code in its dictionary when said character pattern and said its character code are also stored likewise in said dictionaries of a predetermined number of said plurality of information processors.

* * * * *